United States Patent
Catreux-Erceg et al.

(10) Patent No.: US 8,185,075 B2
(45) Date of Patent: *May 22, 2012

(54) SYSTEM AND METHOD FOR CHANNEL BONDING IN MULTIPLE ANTENNA COMMUNICATION SYSTEMS

(75) Inventors: Severine Catreux-Erceg, Cardiff, CA (US); Vinko Erceg, Cardiff, CA (US); Pieter Roux, San Diego, CA (US); Pieter Van Rooyen, San Diego, CA (US); Jack Winters, Middletown, NJ (US)

(73) Assignee: Broadcom Corporation, Irvine, CA (US)

(*) Notice: Subject to any disclaimer, the term of this patent is extended or adjusted under 35 U.S.C. 154(b) by 737 days.

This patent is subject to a terminal disclaimer.

(21) Appl. No.: 12/119,231

(22) Filed: May 12, 2008

(65) Prior Publication Data
US 2008/0261551 A1  Oct. 23, 2008

Related U.S. Application Data

(63) Continuation of application No. 11/009,503, filed on Dec. 10, 2004, now Pat. No. 7,391,832, which is a continuation-in-part of application No. 10/801,930, filed on Mar. 16, 2004, now Pat. No. 7,822,140, and a continuation-in-part of application No. 10/835,255, filed on Apr. 29, 2004, now Pat. No. 7,539,274, and a continuation-in-part of application No. 10/891,443, filed on Jul. 13, 2004, now Pat. No. 7,502,432, and a continuation-in-part of application No. 10/957,398, filed on Oct. 1, 2004, now Pat. No. 7,483,718, and a continuation-in-part of application No. 10/979,992, filed on Nov. 3, 2004, now Pat. No. 7,515,939.

(51) Int. Cl.
H04B 1/10 (2006.01)

(52) U.S. Cl. ........... 455/277.1; 375/349

(58) Field of Classification Search ........... 455/550.1, 455/562.1, 575.1, 101, 102, 103, 133, 134, 455/135, 277.1, 277.2; 375/267, 347, 349
See application file for complete search history.

(56) References Cited

U.S. PATENT DOCUMENTS
4,710,944 A   12/1987   Nossen
(Continued)

FOREIGN PATENT DOCUMENTS
CN   1304218   7/2001
(Continued)

OTHER PUBLICATIONS
Jack H. Winters, et al., "The Impact of Antenna Diversity on the Capacity of Wireless Communication Systems," IEEE Transactions on Communications, vol. 42, No. 2/3/4, Feb., Mar., Apr. 1994, pp. 1740-1751.

(Continued)

*Primary Examiner* — Thanh Le
(74) *Attorney, Agent, or Firm* — Sterne, Kessler, Goldstein & Fox PLLC

(57) ABSTRACT

Systems and methods that provide channel bonding in multiple antenna communication systems are provided. In one embodiment, a method for signal transmission over a plurality of antennas of a transmitter may include, for example, one or more of the following: demultiplexing an input signal into a plurality of signal components; assigning each of the signal components to one of a plurality of logical channels; weighting each of the signal components with transmit baseband weight values; combining ones of the resultant weighted signal components to form a plurality of transmit weighted signals, each of the plurality of transmit weighted signals being assigned to one of the plurality of logical channels; and combining groups of the plurality of transmit weighted signals to form a plurality of output signals capable of being used to generate a plurality RF output signals.

39 Claims, 8 Drawing Sheets

U.S. PATENT DOCUMENTS

| | | | |
|---|---|---|---|
| 5,345,599 A | 9/1994 | Paulraj et al. | |
| 5,548,819 A | 8/1996 | Robb | |
| 5,566,209 A | 10/1996 | Forssen et al. | |
| 5,625,880 A | 4/1997 | Goldburg et al. | |
| 5,642,353 A | 6/1997 | Roy, III et al. | |
| 5,649,287 A | 7/1997 | Forssen et al. | |
| 5,719,583 A | 2/1998 | Kanai | |
| 5,796,779 A | 8/1998 | Nussbaum et al. | |
| 5,809,422 A | 9/1998 | Raleigh et al. | |
| 5,822,312 A | 10/1998 | Peach et al. | |
| 5,834,972 A | 11/1998 | Schiemenz et al. | |
| 5,875,216 A | 2/1999 | Martin | |
| 5,949,833 A | 9/1999 | Weerackody | |
| 5,991,273 A | 11/1999 | Abu-Dayya | |
| 5,999,826 A | 12/1999 | Whinnett | |
| 6,009,307 A | 12/1999 | Granata et al. | |
| 6,016,124 A | 1/2000 | Lo et al. | |
| 6,044,120 A | 3/2000 | Bar-David et al. | |
| 6,067,290 A | 5/2000 | Paulraj et al. | |
| 6,097,773 A | 8/2000 | Carter et al. | |
| 6,115,409 A | 9/2000 | Upadhyay et al. | |
| 6,115,426 A | 9/2000 | Fujimoto et al. | |
| 6,141,393 A | 10/2000 | Thomas et al. | |
| 6,144,711 A | 11/2000 | Raleigh et al. | |
| 6,154,485 A | 11/2000 | Harrison | |
| 6,192,256 B1 | 2/2001 | Whinnett | |
| 6,240,098 B1 | 5/2001 | Thibault et al. | |
| 6,327,314 B1 | 12/2001 | Cimini et al. | |
| 6,351,499 B1 | 2/2002 | Paulraj et al. | |
| 6,373,433 B1 | 4/2002 | Espax et al. | |
| 6,377,631 B1 | 4/2002 | Raleigh | |
| 6,400,318 B1 | 6/2002 | Kasami et al. | |
| 6,408,189 B1 | 6/2002 | Nakamura et al. | |
| 6,434,375 B1 | 8/2002 | Chulajata et al. | |
| 6,452,981 B1 | 9/2002 | Raleigh et al. | |
| 6,473,467 B1 | 10/2002 | Wallace et al. | |
| 6,473,472 B1 | 10/2002 | Uchiki et al. | |
| 6,483,459 B1 | 11/2002 | Hou et al. | |
| 6,523,052 B1 | 2/2003 | Staszewski | |
| 6,590,532 B1 | 7/2003 | Ogawa et al. | |
| 6,622,013 B1 | 9/2003 | Miyoshi et al. | |
| 6,628,969 B1 | 9/2003 | Rilling | |
| 6,654,429 B1 | 11/2003 | Li | |
| 6,697,017 B1 | 2/2004 | Shmuel | |
| 6,721,339 B2 | 4/2004 | Li et al. | |
| 6,731,685 B1 | 5/2004 | Liu et al. | |
| 6,754,511 B1 | 6/2004 | Halford et al. | |
| 6,765,969 B1 | 7/2004 | Vook et al. | |
| 6,774,864 B2 | 8/2004 | Evans et al. | |
| 6,778,612 B1 | 8/2004 | Lozano et al. | |
| 6,785,520 B2 | 8/2004 | Sugar et al. | |
| 6,804,216 B1 | 10/2004 | Kuwahara et al. | |
| 6,859,503 B2 | 2/2005 | Pautler et al. | |
| 6,873,651 B2 | 3/2005 | Tesfai et al. | |
| 6,882,678 B2 | 4/2005 | Kong et al. | |
| 6,888,809 B1 | 5/2005 | Foschini et al. | |
| 6,891,516 B1 | 5/2005 | Saunders et al. | |
| 6,917,820 B2 | 7/2005 | Gore et al. | |
| 6,927,728 B2 | 8/2005 | Vook et al. | |
| 6,931,081 B2 | 8/2005 | Meijer et al. | |
| 6,934,323 B2 | 8/2005 | Hara | |
| 6,941,123 B2 | 9/2005 | Choi et al. | |
| 6,959,169 B2 | 10/2005 | Miyoshi | |
| 6,968,022 B1 | 11/2005 | Poor et al. | |
| 6,975,603 B1 | 12/2005 | Dicker et al. | |
| 6,999,528 B2 | 2/2006 | Brankovic et al. | |
| 6,999,538 B2 | 2/2006 | Kung et al. | |
| 7,024,166 B2 | 4/2006 | Wallace et al. | |
| 7,027,536 B1 | 4/2006 | Al-Dhahir | |
| 7,035,612 B2 | 4/2006 | Kishimoto et al. | |
| 7,065,146 B1 | 6/2006 | Lou et al. | |
| 7,079,867 B2 | 7/2006 | Chun et al. | |
| 7,103,120 B2 | 9/2006 | Shibata | |
| 7,110,468 B2 | 9/2006 | Kohno et al. | |
| 7,113,548 B2 | 9/2006 | Tanaka et al. | |
| 7,130,354 B1 | 10/2006 | Murphy et al. | |
| 7,139,328 B2 | 11/2006 | Thomas et al. | |
| 7,151,803 B1 | 12/2006 | Sonalkar | |
| 7,154,959 B2 | 12/2006 | Erceg et al. | |
| 7,154,960 B2 | 12/2006 | Liu et al. | |
| 7,170,926 B2 | 1/2007 | Zeira | |
| 7,173,975 B1 | 2/2007 | Al-Dhahir et al. | |
| 7,212,578 B2 | 5/2007 | Lee et al. | |
| 7,218,684 B2 | 5/2007 | Bolourchi et al. | |
| 7,230,910 B2 | 6/2007 | Beck et al. | |
| 7,230,931 B2 | 6/2007 | Struhsaker | |
| 7,236,537 B2 | 6/2007 | Hottinen et al. | |
| 7,236,539 B2 | 6/2007 | Deng et al. | |
| 7,242,720 B2 | 7/2007 | Sugiyama et al. | |
| 7,245,679 B2 | 7/2007 | Aoki et al. | |
| 7,248,645 B2 | 7/2007 | Vialle et al. | |
| 7,248,656 B2 | 7/2007 | da Silveira et al. | |
| 7,254,184 B2 | 8/2007 | Buljore et al. | |
| 7,283,499 B2 | 10/2007 | Priotti et al. | |
| 7,313,737 B2 | 12/2007 | Gronberg et al. | |
| 7,315,573 B2 | 1/2008 | Lusky et al. | |
| 7,391,832 B2 | 6/2008 | Catreux-Erces et al. | |
| 7,483,718 B2 | 1/2009 | Catreux-Erceg et al. | |
| 7,502,432 B2 | 3/2009 | Catreux-Erceg et al. | |
| 7,515,939 B2 | 4/2009 | Catreux-Erceg et al. | |
| 7,535,969 B2 * | 5/2009 | Catreux et al. | 375/267 |
| 7,539,274 B2 | 5/2009 | Catreux et al. | |
| 7,813,441 B2 | 10/2010 | Jalali et al. | |
| 7,822,140 B2 | 10/2010 | Catreux et al. | |
| 7,840,235 B2 | 11/2010 | Catreux-Erceg et al. | |
| 7,890,145 B2 | 2/2011 | Catreux-Erceg et al. | |
| 8,000,746 B2 | 8/2011 | Catreux-Erceg et al. | |
| 8,036,711 B2 | 10/2011 | Catreux-Erceg et al. | |
| 8,068,570 B2 | 11/2011 | Catreux-Erceg et al. | |
| 2001/0046270 A1 | 11/2001 | Uchiki et al. | |
| 2001/0049295 A1 | 12/2001 | Matsuoka et al. | |
| 2002/0003842 A1 | 1/2002 | Suzuki et al. | |
| 2002/0051435 A1 | 5/2002 | Giallorenzi et al. | |
| 2002/0085653 A1 | 7/2002 | Matsuoka et al. | |
| 2002/0102950 A1 | 8/2002 | Gore et al. | |
| 2002/0105472 A1 | 8/2002 | Voyer | |
| 2002/0118724 A1 | 8/2002 | Kishimoto et al. | |
| 2002/0118781 A1 | 8/2002 | Thomas et al. | |
| 2002/0126042 A1 | 9/2002 | Chang et al. | |
| 2002/0181629 A1 | 12/2002 | Shibata | |
| 2002/0197998 A1 | 12/2002 | Schmidt | |
| 2003/0026366 A1 | 2/2003 | Matsui et al. | |
| 2003/0027540 A1 | 2/2003 | Da Torre | |
| 2003/0043929 A1 | 3/2003 | Sampath | |
| 2003/0043942 A1 | 3/2003 | Ono | |
| 2003/0045313 A1 | 3/2003 | Iwamatsu et al. | |
| 2003/0072380 A1 | 4/2003 | Huang | |
| 2003/0072382 A1 | 4/2003 | Raleigh et al. | |
| 2003/0083016 A1 | 5/2003 | Evans et al. | |
| 2003/0095590 A1 | 5/2003 | Fuller et al. | |
| 2003/0142756 A1 | 7/2003 | Kohno et al. | |
| 2003/0162519 A1 | 8/2003 | Smith et al. | |
| 2003/0185285 A1 | 10/2003 | Talwar | |
| 2003/0185309 A1 | 10/2003 | Pautler et al. | |
| 2003/0203743 A1 * | 10/2003 | Sugar et al. | 455/550.1 |
| 2003/0215021 A1 | 11/2003 | Simmonds | |
| 2003/0231547 A1 | 12/2003 | Yang | |
| 2004/0017847 A1 | 1/2004 | Alberth et al. | |
| 2004/0028157 A1 | 2/2004 | Aoki et al. | |
| 2004/0032910 A1 | 2/2004 | Horng et al. | |
| 2004/0095907 A1 | 5/2004 | Agee et al. | |
| 2004/0120276 A1 | 6/2004 | Golla et al. | |
| 2004/0125900 A1 | 7/2004 | Liu et al. | |
| 2004/0142728 A1 | 7/2004 | Tari et al. | |
| 2004/0165558 A1 | 8/2004 | Ling et al. | |
| 2004/0165675 A1 | 8/2004 | Ito et al. | |
| 2004/0196919 A1 | 10/2004 | Mehta et al. | |
| 2004/0198452 A1 | 10/2004 | Roy | |
| 2004/0208258 A1 | 10/2004 | Lozano et al. | |
| 2005/0031047 A1 | 2/2005 | Maltsev et al. | |
| 2005/0032497 A1 | 2/2005 | Girardeau Jr. et al. | |
| 2005/0047517 A1 | 3/2005 | Georgios et al. | |
| 2005/0053123 A1 | 3/2005 | Higuchi et al. | |
| 2005/0053164 A1 | 3/2005 | Catreux et al. | |
| 2005/0069024 A1 | 3/2005 | Li et al. | |
| 2005/0074080 A1 | 4/2005 | Catreux et al. | |
| 2005/0075081 A1 | 4/2005 | Catreux-Erceg et al. | |

| | | |
|---|---|---|
| 2005/0090205 A1 | 4/2005 | Catreux |
| 2005/0094741 A1 | 5/2005 | Kuroda |
| 2005/0105632 A1 | 5/2005 | Catreaux-Erceg et al. |
| 2005/0117660 A1 | 6/2005 | Vialle et al. |
| 2005/0141459 A1 | 6/2005 | Li et al. |
| 2005/0141630 A1 | 6/2005 | Catreux et al. |
| 2005/0141631 A1 | 6/2005 | Takano |
| 2005/0143014 A1 | 6/2005 | Li et al. |
| 2005/0238108 A1 | 10/2005 | Suh et al. |
| 2006/0008024 A1 | 1/2006 | Wight |
| 2006/0014511 A1 | 1/2006 | Ghassemzadeh et al. |
| 2006/0029146 A1 | 2/2006 | Catreux et al. |
| 2006/0104197 A1 | 5/2006 | Proctor Jr. et al. |
| 2006/0135101 A1 | 6/2006 | Binshlok et al. |
| 2006/0176974 A1 | 8/2006 | Smith et al. |
| 2007/0047552 A1 | 3/2007 | Astely |
| 2007/0147533 A1 | 6/2007 | Thomas et al. |
| 2007/0243839 A1* | 10/2007 | Kostic ......................... 455/101 |
| 2008/0031314 A1 | 2/2008 | Priotti et al. |
| 2009/0017769 A1 | 1/2009 | Chen et al. |
| 2009/0191832 A1 | 7/2009 | Catreux-Erceg et al. |
| 2009/0201205 A1 | 8/2009 | Catreux-Erceg et al. |
| 2009/0233567 A1 | 9/2009 | Catreux et al. |
| 2009/0238310 A1 | 9/2009 | Catreux-Erceg et al. |
| 2011/0086671 A1 | 4/2011 | Catreux-Erceg et al. |
| 2011/0096860 A1 | 4/2011 | Catreux-Erceg et al. |
| 2011/0188547 A1 | 8/2011 | Catreux-Erceg et al. |
| 2011/0300822 A1 | 12/2011 | Catreux-Erceg et al. |

FOREIGN PATENT DOCUMENTS

| | | |
|---|---|---|
| CN | 1269075 A | 10/2004 |
| EP | 1158695 | 5/2001 |
| EP | 1117197 | 7/2001 |
| EP | 1227542 | 7/2002 |
| WO | 98/09381 | 3/1998 |
| WO | 98/52300 | 11/1998 |
| WO | 02/03557 A1 | 1/2002 |
| WO | WO0203642 | 1/2002 |
| WO | 02/080375 | 10/2002 |
| WO | 2005/062498 | 7/2005 |

OTHER PUBLICATIONS

Chen-Nee Chuah, et al., "Capacity of Multi-antenna Array Systems in Indoor Wireless Environment," Proceedings of Globecom'98 Sydney, Australia, IEEE 1998, pp. 1894-1899.

Da-Shan Shiu, et al., "Fading Correlation and Its Effect on the Capacity of Multielement Antenna Systems," IEEE Transactions on Communications, vol. 48, No. 3, pp. 502-513, Mar. 2000.

G.J. Foschini, et al., "On Limits of Wireless Communications in a Fading Environment when Using Multiple Antennas," Kluwer Academic Publishers, vol. 6, No. 3, Mar. 1998, pp. 311-335.

G.J. Foschini, et al., "Simplified Processing for High Spectral Efficiency Wireless Communication Employing Multi-element Arrays," IEEE Journal on Selected Areas in Communications, vol. 17, Issue 11, Nov. 1999, pp. 1841-1852.

Andreas F. Molisch, et al., "Capacity of MIMO Systems with Antenna Selection," Proceedings of IEEE ICC, Helsinki, Finland, Jun. 1001, vol. 2, pp. 570-574.

Rick S. Blum, et al., "On Optimum MIMO with Antenna Selection," IEEE Communications Letters, vol. 6, Issue 8, Aug. 2002, pp. 322-324.

Jack H. Winters, "Optimum Combining for Indoor Radio Systems with Multiple Users," IEEE Transactions on Communications, vol. COM-35, No. 11, Nov. 1987, pp. 1222-1230.

S.M. Alamouti, "A Simple Transmit Diversity Technique for Wireless Communications," IEEE Journal on Selected Areas in Communications, vol. 16, Issue 8, Oct. 1998, pp. 1451-1458.

Jan-Jaap Van De Beek, et al., "On Channel Estimation in OFDM Systems," IEEE 45$^{th}$ Vehicular Technology conference, vol. 2, Jul. 25-28, 1995, pp. 815-819.

Apurva N. Moday, et al., "Synchornization for MIMO of OFDM Systems," IEEE Globecom 2001, vol. 1, pp. 509-513.

Severine Catreux, et al. "Adaptive Modulation and MIMO Coding for Broadband Wireless Data Networks," IEEE Blobecom 2001, vol. 1, pp. 108-115.

John G. Proakis, Digital Communications, 3$^{rd}$ Edition, McGraw Hill Series 1995, pp. 257-260, 269-274 and 278-282.

Jorgen B. Andersen, "Antenna Arrays in Mobile Communications: Gain, Diversity, and Channel Capacity," IEEE Antennas and Propagation Magazine, vol. 42, No. 2, Apr. 2000, pp. 12-16.

IEEE 802.11a standard; 1999.

IEEE 802.11g standard; Jun. 2003.

P.W. Wolniasky et al., "V-BLAST: An Architecture for Realizing Very High Data Rates over the Rich-scattering Wireless Channel," Proceedings of URSI ISSE, Bell Laboratories, Lucent Technologies, Crawford Hill Laboratory, Holmdel, NJ, Sep. 1998, pp. 295-300.

S. Catreux, et al., "Adaptive Modulation and MIMO Coding for Broadband Wireless Data Networks," *IEEE Communications Magazine*, vol. 40, No. 6, Jun. 2002, pp. 108-115.

S. Haykin, Adaptive Filter Theory, 3$^{rd}$ Ed., Prentice Hall, 1996, pp. 194-206.

Anders Furuskär et al., "EDGE: Enhanced Data Rates for GSM and TDMA/136 Evolution," IEEE Personal Communications Magazine, vol. 6, Issue 3, Jun. 1999, pp. 56-66.

International Search Report for PCT/US2004/041809 (May 30, 2005).

Gore et al., "Statistical MIMO Antenna Sub-Set Selection with Space-Time Coding," 2002 IEEE International Conference on Communications, Conference Proceedings, New York, N.Y., vol. 1, pp. 641-645 (Apr. 28, 2002).

International Preliminary Report on Patentability for PCT/US2004/041809 (Jun. 12, 2006).

Alexander Seeger et al., "Antenna We3ight Verification for Closed-Loop Downlink Eigenbeamforming," IEEE 2002, 3-2, pp. 982-986.

D.A. Gore et al.; "MIMO Antenna Subset Selection with Space-time Coding;" IEEE Transactions on Signal Processing, IEEE, Inc., New York, USA; vol. 50, No. 10, Oct. 2002; pp. 2580-2588; XP001200163; ISSN: 1053-587X.

H-S Kim et al.; "Optimal Antenna Selection Scheme with Transmit Adaptive Array for Wideband CDMA Systems;" IEICE Transactions on Fundamentals of Electronics, Communications and Computer Sciences, Institute of Electronics Information and Comm. Eng., Tokyo, Japan; vol. E86A, No. 6; Jun. 2003; pp. 1414-1420, XP001171080; ISSN: 0916-8508.

R.W. Heath et al.; "Antenna Selection for Spatial Multiplexing Systems Based on Minimum Error Rate;" ICC 2001; 2001 IEEE International Conference on Communications, Conference Record; Helsinky, Finland; Jun. 2001; IEEE International Conference on Communications, New York, NY; IEEE, USA; vol. 1 of 10; Jun. 2001; pp. 2276-2280; ISBN: 0-7803-7097-1.

A. Gorokhov et al.; "Performance Bounds for Antenna Selection in MIMO Systems;" ICC 2003; 2003 IEEE International Conference on Communications; Anchorage, Alaska; May 2003; IEEE International Conference on Communications, New York, NY; IEEE, USA; vol. 1 of 5; May 2003; pp. 3021-3025; XP010643001; ISBN: 0-7803-7802-4.

International Search Report for Application No. PCT/US2004/032648, mailed Jun. 9, 2005.

International Search Report for PCT/US04/08296, mailed Dec. 10, 2004.

International Search Report for PCT/US04/013581, mailed Dec. 20, 2004.

EPO Communication dated Sep. 22, 2011 in Application No. 04749408.3-1246 / 1606916 PCT/US2004008296 (3 pages).

* cited by examiner

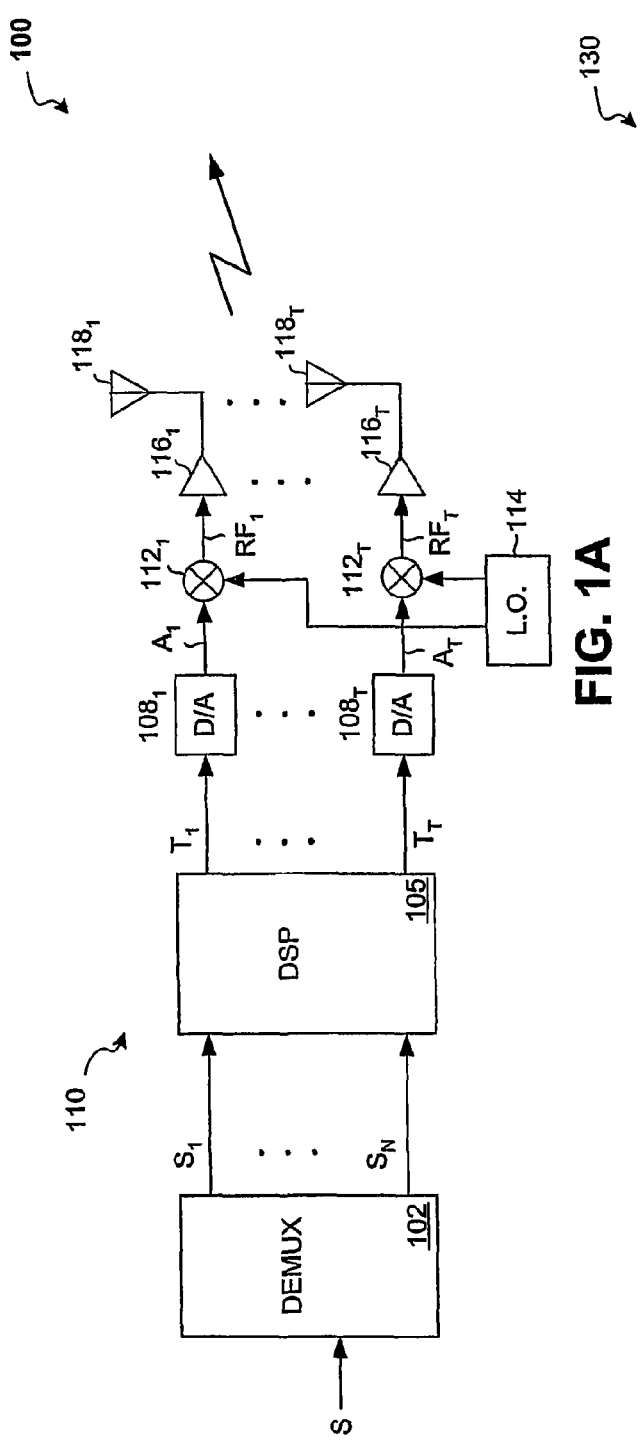
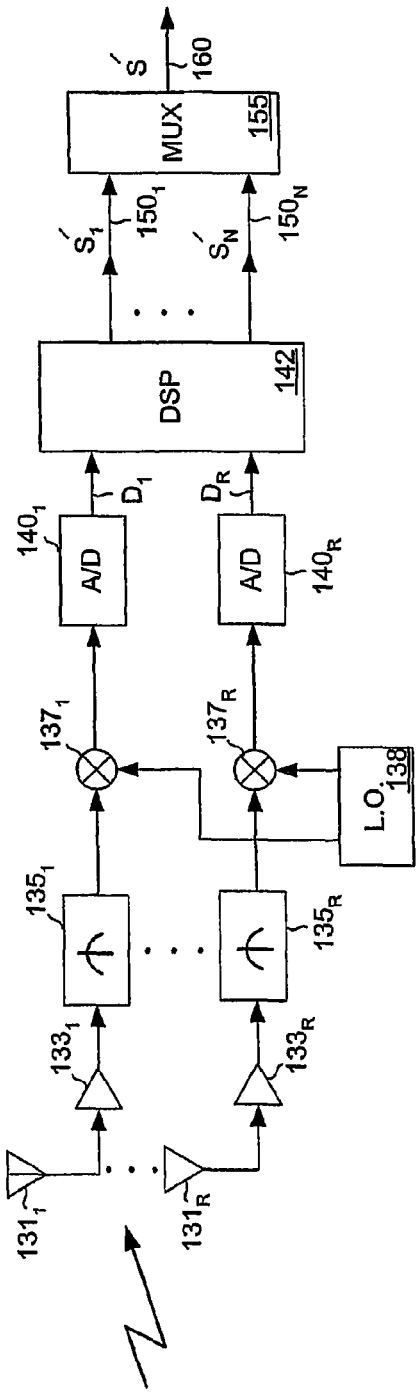
FIG. 1A
FIG. 1B

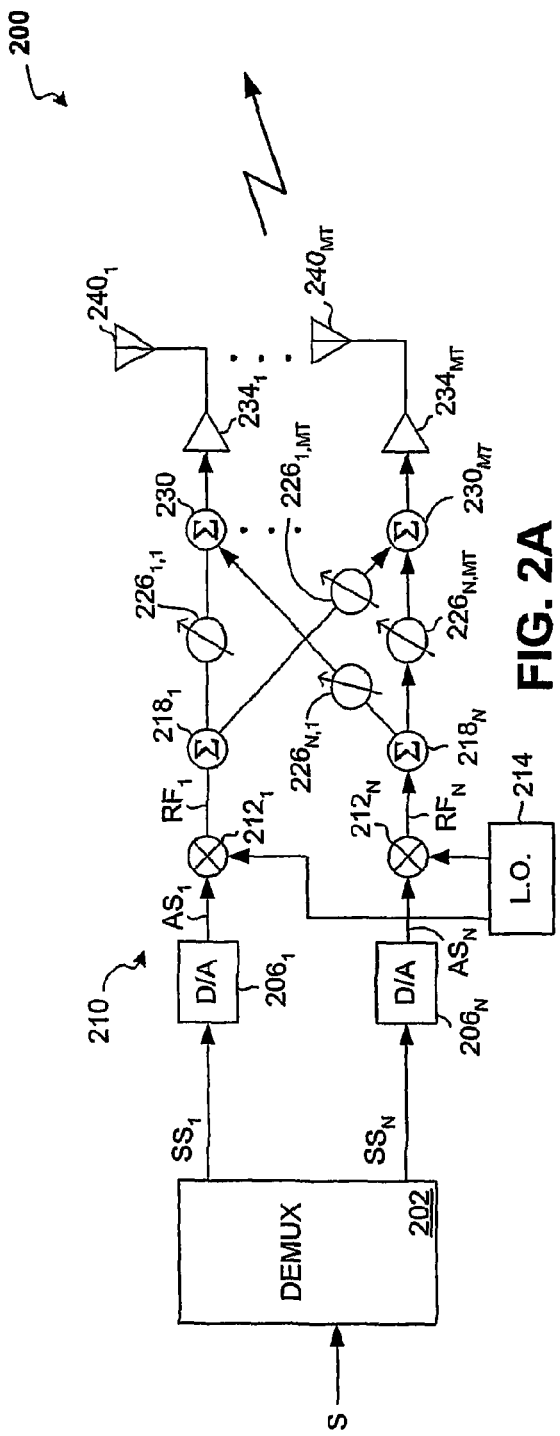
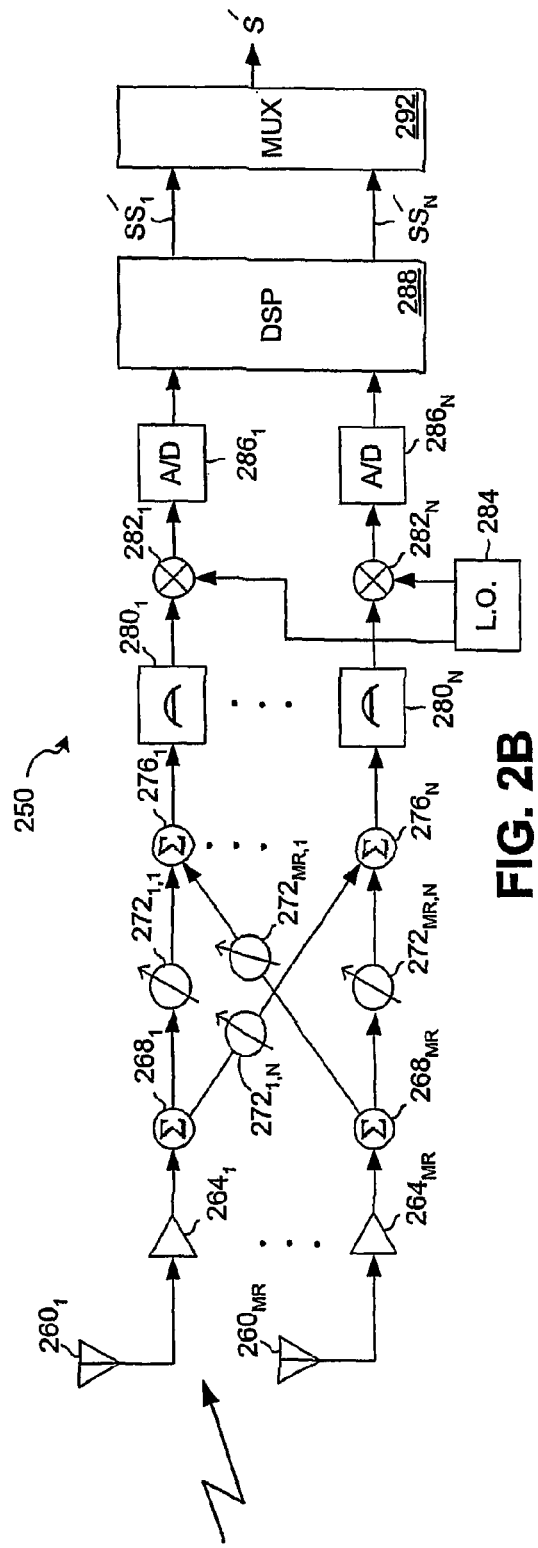
FIG. 2A
FIG. 2B

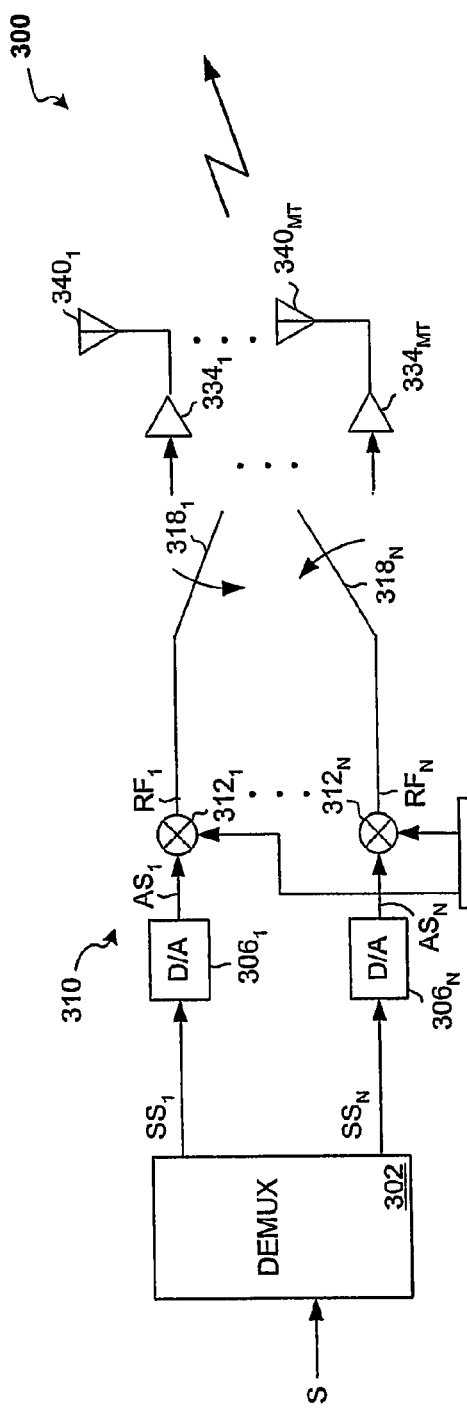
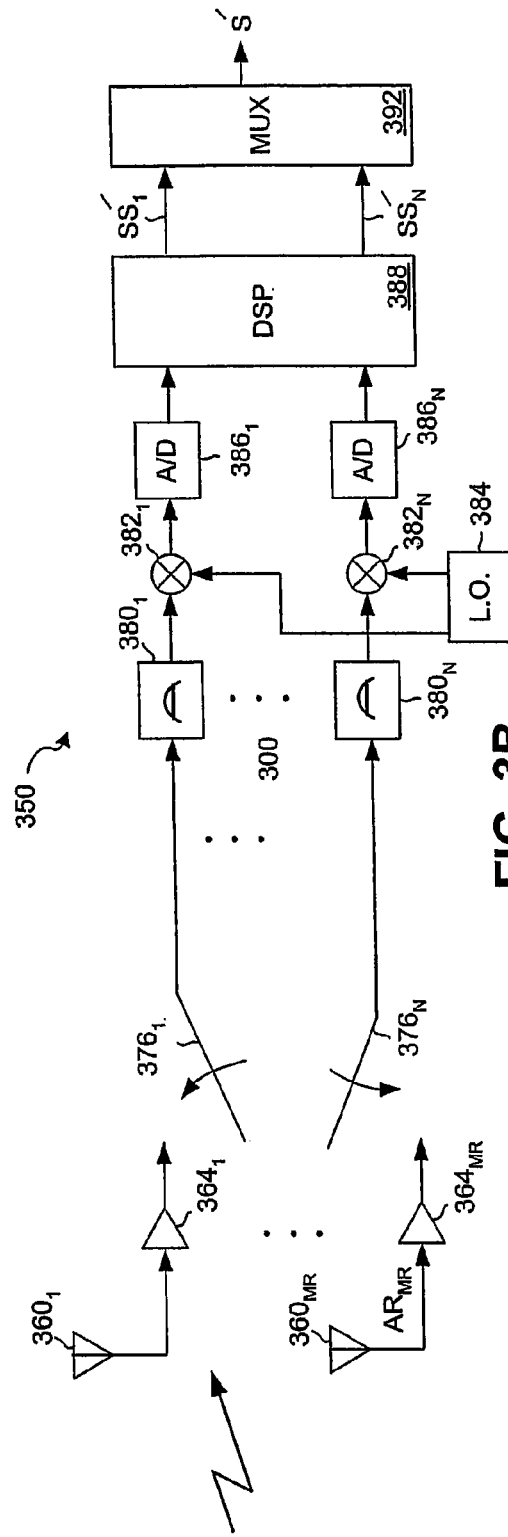
FIG. 3A
FIG. 3B

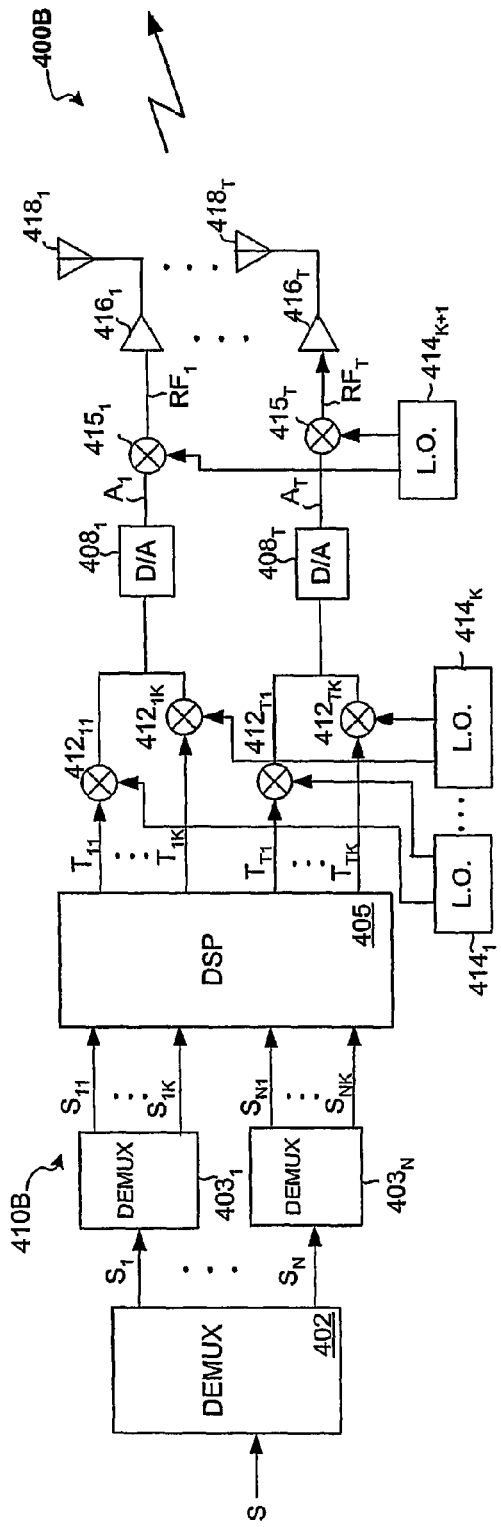
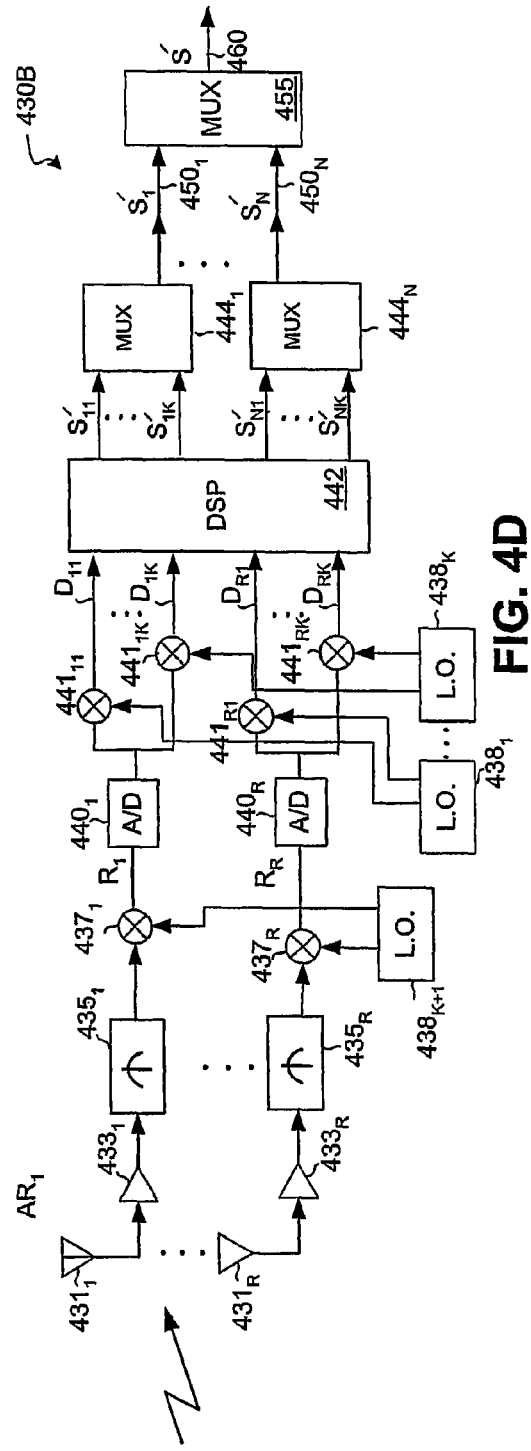
FIG. 4C
FIG. 4D

SYSTEM AND METHOD FOR CHANNEL BONDING IN MULTIPLE ANTENNA COMMUNICATION SYSTEMS

CROSS REFERENCE TO RELATED APPLICATIONS

This application is a CONTINUATION OF U.S. application Ser. No. 11/009,503, filed Dec. 10, 2004, which is a CONTINUATION-IN-PART of U.S. application Ser. No. 10/801,930, filed Mar. 16, 2004, which claims priority to and claims benefit from U.S. Application No. 60/456,023, filed Mar. 17, 2003.

U.S. application Ser. No. 11/009,503 is also a CONTINUATION-IN-PART of U.S. application Ser. No. 10/835,255, filed Apr. 29, 2004, which claims priority to and claims benefit from U.S. Application No. 60/467,295, filed May 1, 2003.

U.S. application Ser. No. 11/009,503 is also a CONTINUATION-IN-PART of U.S. application Ser. No. 10/891,443, filed Jul. 13, 2004, which claims priority to and claims benefit from U.S. Application No. 60/488,845, filed Jul. 21, 2003.

U.S. application Ser. No. 11/009,503 is also a CONTINUATION-IN-PART of U.S. application Ser. No. 10/957,398, filed Oct. 1, 2004, which claims priority to and claims benefit from U.S. Application No. 60/507,843, filed Oct. 1, 2003.

U.S. application Ser. No. 11/009,503 is also a CONTINUATION-IN-PART of U.S. patent application Ser. No. 10/979,992, filed on Nov. 3, 2004, which claims priority to and claims benefit from U.S. Application No. 60/519,398, filed on Nov. 12, 2003.

U.S. application Ser. No. 11/009,503 makes reference to, claims priority to and claims benefit from U.S. Application No. 60/529,178, filed on Dec. 11, 2003.

INCORPORATION BY REFERENCE

The above-identified United States patent applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Most current wireless communication systems are composed of nodes configured with a single transmit and receive antenna. However, for a wide range of wireless communication systems, it has been predicted that the performance, including capacity, may be substantially improved through the use of multiple transmit and/or multiple receive antennas. Such configurations form the basis of "smart" antenna techniques. Smart antenna techniques, coupled with space-time signal processing, can be utilized both to combat the deleterious effects of multipath fading of a desired incoming signal and to suppress interfering signals. In this way, both the performance and capacity of digital wireless systems in existence or being deployed (e.g., CDMA-based systems, TDMA-based systems, WLAN systems, and OFDM-based systems such as IEEE 802.11a/g) may be improved.

At least some of the impairments to the performance of wireless systems of the type described above may be at least partially ameliorated by using multi-element antenna systems designed to introduce a diversity gain and suppress interference within the signal reception process. This has been described, for example, in "The Impact of Antenna Diversity On the Capacity of Wireless Communication Systems", by J. H. Winters et al., IEEE Transactions on Communications, vol. 42, no. 2/3/4, pages 1740-1751, February 1994. Such diversity gains improve system performance by mitigating multipath for more uniform coverage, increasing received signal-to-noise ratio for greater range or reduced required transmit power, and providing more robustness against interference or permitting greater frequency reuse for higher capacity.

Within communication systems incorporating multi-antenna receivers, a set of M receive antennas may be capable of nulling up to M-1 interferers. Accordingly, N signals may be simultaneously transmitted in the same bandwidth using N transmit antennas, with the transmitted signal then being separated into N respective signals by way of a set of N antennas deployed at the receiver. Systems of this type are generally referred to as multiple-input-multiple-output (MIMO) systems, and have been studied extensively. See, e.g., "Optimum combining for indoor radio systems with multiple users", by J. H. Winters, IEEE Transactions on Communications, vol. COM-35, no. 11, November 1987; "Capacity of Multi-Antenna Array Systems In Indoor Wireless Environment", by C. Chuah et al., Proceedings of Globecom '98 Sydney, Australia, IEEE 1998, pages 1894-1899 November 1998; and "Fading Correlation and Its Effect on the Capacity of Multi-Element Antenna Systems" by D. Shiu et al., IEEE Transactions on Communications, vol. 48, no. 3, pages 502-513, March 2000.

Some multi-element antenna arrangements (e.g., some MIMOs) provide system capacity enhancements that can be achieved using the above-referenced configurations. Under the assumption of perfect estimates of the applicable channel at the receiver, in a MIMO system the received signal decomposes to M "spatially-multiplexed" independent channels. This results in an M-fold capacity increase relative to single-antenna systems. For a fixed overall transmitted power, the capacity offered by MIMOs scales linearly with the number of antenna elements. Specifically, it has been shown that with N transmit and N receive antennas an N-fold increase in the data rate over a single antenna system can be achieved without any increase in the total bandwidth or total transmit power. See, e.g., "On Limits of Wireless Communications in a Fading Environment When Using Multiple Antennas", by G. J. Foschini et al., Wireless Personal Communications, Kluwer Academic Publishers, vol. 6, no. 3, pages 311-335, March 1998. In experimental MIMO systems predicated upon N-fold spatial multiplexing, more than N antennas are often deployed at a given transmitter or receiver. This is because each additional antenna adds to the diversity gain and antenna gain and interference suppression applicable to all N spatially-multiplexed signals. See, e.g., "Simplified processing for high spectral efficiency wireless communication employing multi-element arrays", by G. J. Foschini et al., IEEE Journal on Selected Areas in Communications, vol. 17, issue 11, November 1999, pages 1841-1852.

Although increasing the number of transmit and/or receive antennas enhances various aspects of the performance of MIMO systems, the provision of a separate RF chain for each transmit and receive antenna increases costs. Each RF chain is generally comprised a low noise amplifier, filter, downconverter, and analog-to-digital converter (A/D), with the latter three devices typically being responsible for most of the cost of the RF chain. In certain existing single-antenna wireless receivers, the single required RF chain may account for in excess of 30% of the receiver's total cost. It is thus apparent that as the number of transmit and receive antennas increases, overall system cost and power consumption may dramatically increase.

Another potentially attractive technique used, for example, to increase the data rate of a wireless link without necessarily increasing the required number of RF chains is channel bonding. In some applications, channel bonding may fall within a category of multiple access techniques, for example, employed in wireless communication systems. The channel bonding allocates and shares the available radio resource among various users. The available radio resource is decomposed into distinct logical channels in the time, frequency and code domains. A particular logical channel is defined by a frequency slot number, a time slot number and/or a code number in accordance with such decomposition. Typically (e.g., without channel bonding), a user is assigned one logical channel (e.g., a single frequency band over which a transmitter and receiver communicate). On the other hand, when channel bonding is used, a larger pool of bandwidth is made available for each user by permitting the user to communicate over multiple logical channels in parallel, thereby achieving higher data rates. An example of channel bonding in a system operating in accordance with a Time Division Multiple Access (TDMA) protocol is described in, for example, "EDGE: Enhanced Data Rates for GSM and TDMA/136 Evolution," by A. Furuskar et al., IEEE Personal Communications Magazine, vol. 6, issue 3, pages 56-66 (June 1999). In the described EDGE system, larger numbers of time division slots are allocated to particular users to permit the users to experience greater throughput. Similarly, the use of channel bonding used in Code Division Multiple Access (CDMA), Frequency Division Multiple Access (FDMA) and TDMA-based systems is described in, for example, U.S. Patent Application Publication Nos. 20020197998 and 20020051435.

Further limitations and disadvantages of conventional and traditional approaches will become apparent to one of ordinary skill in the art through comparison of such systems with some embodiments according to some aspects of the present invention as set forth in the remainder of the present application with reference to the drawings.

BRIEF SUMMARY OF THE INVENTION

Some embodiments according to some aspects of the present invention may relate to channel bonding in multiple antenna communication systems. Some embodiments according to some aspects of the present invention may relate to channel bonding for data rate maximization in multi-antenna communication systems.

In an embodiment according to some aspects of the present invention, a method for signal transmission over a plurality of antennas of a transmitter may include, for example, one or more of the following: demultiplexing an input signal into a plurality of signal components; assigning each of the signal components to one of a plurality of logical channels; weighting each of the signal components with transmit baseband weight values; combining ones of the resultant weighted signal components to form a plurality of transmit weighted signals, each of the plurality of transmit weighted signals being assigned to one of the plurality of logical channels; and combining groups of the plurality of transmit weighted signals to form a plurality of output signals capable of being used to generate a plurality RF output signals.

In another embodiment according to some aspects of the present invention, a method is provided which may receive a transmitted radio frequency (RF) signal based on an input signal. The transmitted RF signal may be received by a plurality of antennas of a receiver. The antennas may be adapted to produce a corresponding plurality of receive RF signals in response to the transmitted RF signals. The method may include, for example, one or more of the following: splitting each of the plurality of received RF signals into a plurality of signal components; identifying which one of a plurality of logical channels is assigned to each of the signal components; weighting each of the signal components with receive baseband weight values; combining ones of the resultant weighted signal components to form a plurality of receive weighted signals, each of the receive weighted signals being assigned to one of the plurality of logical channels; and multiplexing the plurality of receive weighted signals to obtain an estimate of the input signal.

In another embodiment according to some aspects of the present invention, a signal reception method is provided which may be used within a receiver. The receiver may include, for example, a plurality of antennas adapted to produce a corresponding plurality of receive RF signals in response to an incidence of a transmitted RF signal which originated from an input signal including a set of spatially-multiplexed signals. The method may include, for example, one or more of the following: splitting each of the plurality of receive RF signals into a plurality of signal components; identifying which one of a plurality of logical channels is assigned to each of the signal components; weighting each of the signal components with receive baseband weight values; combining ones of the resultant weighted signal components to form a plurality of receive weighted signals, each of the receive weighted signals being assigned to one of the plurality of logical channels and being associated with one of the spatially-multiplexed signals; multiplexing a group of the plurality of receive weighted signals corresponding to each of the spatially-multiplexed signals to form a plurality of multiplexed received signals; and multiplexing the plurality of multiplexed received signals to obtain an estimate of the input signal.

In another embodiment according to some aspects of the present invention, a method for signal transmission over a plurality of antennas of a transmitter may include, for example, one or more of the following: demultiplexing an input signal into a first plurality of signal components representative of a corresponding second plurality of spatially-multiplexed signals; assigning each of the signal components to one of a plurality of logical channels within the RF domain to produce a plurality of assigned RF signals; combining groups of the assigned RF signals corresponding to each of the second plurality of spatially-multiplexed signals to generate a second plurality of combined RF signals; splitting each of the combined RF signals; weighting the resultant split signals with a set of transmit weighting values to generate a plurality of transmit weighted RF signals; and combining sets of the plurality of transmit weighted RF signals to form a plurality of RF output signals capable of being transmitted through the plurality of antennas.

In another embodiment according to some aspects of the present invention, a multi-antenna transmitter may include, for example, a demultiplexer arrangement, a digital signal processor and means for generating a set of RF output signals in response to a plurality of baseband output signals. The demultiplexer arrangement may be configured, for example, to produce a plurality of signal components in response to an input signal. The digital signal processor may be operatively coupled to the demultiplexer arrangement and may be adapted to perform, for example, one or more the following:

assigning each of the signal components to one of a plurality of logical channels; weighting each of the signal components with transmit baseband weight values; combining ones of the resultant weighted signal components to form a plurality of transmit weighted signals, each of the plurality of transmit weighted signals being assigned to one of the plurality of logical channels; and combining groups of the plurality of transmit weighted signals to form a plurality of baseband output signals.

In another embodiment according to some aspects of the present invention, a multi-antenna receiver may include, for example, a plurality of antennas, an RF processing arrangement, a digital signal processor and a multiplexer arrangement. The plurality of antennas may be adapted to produce a corresponding plurality of receive RF signals in response to an incidence of a transmitted RF signal originating from an input signal. The RF processing arrangement may be adapted to split each of the plurality of received RF signals into a plurality of signal components and to identify which one of a plurality of logical channels is assigned to each of the signal components. The digital signal processor may be coupled to the RF processing arrangement and may be adapted to weight each of the signal components with receive baseband weight values and to combine ones of the resultant weighted signal components to form a plurality of receive weighted signals. Each of the receive weighted signals may be assigned to one of the plurality of logical channels. The multiplexer arrangement may be adapted to multiplex the plurality of receive weighted signals to obtain an estimate of the input signal.

In yet another embodiment according to some aspects of the present invention, a multi-antenna receiver may include, for example, a plurality of antennas, an RF processing arrangement, a digital signal processor and a multiplexer arrangement. The plurality of antennas may be adapted to produce a corresponding plurality of received RF signals in response to an incidence of a transmitted RF signal which originated from an input signal including a set of spatially-multiplexed signals. The RF processing arrangement may be adapted to split each of the plurality of received RF signals into a plurality of signal components and to identify which one of a plurality of logical channels is assigned to each of the signal components. The digital signal processor may be coupled to the RF processing arrangement and may be adapted to weight each of the signal components with receive baseband weight values and to combine ones of the resultant weighted signal components to form a plurality of receive weighted signals. Each of the receive weighted signals may be assigned to one of the plurality of logical channels and may be associated with one of the spatially-multiplexed signals. The multiplexing arrangement may be coupled to the digital signal processor and may be adapted to multiplex a group of the plurality of receive weighted signals corresponding to each of the spatially-multiplexed signals to form a plurality of multiplexed received signals and to multiplex the plurality of multiplexed received signals to obtain an estimate of the input signal.

In yet still another embodiment according to some aspects of the present invention, a multi-antenna transmitter may include, for example, a demultiplexer arrangement, an RF channelization arrangement and an RF processing module. The demultiplexer arrangement may be adapted to demultiplex an input information signal into a first plurality of signal components representative of a corresponding second plurality of spatially-multiplexed signals. The RF channelization arrangement may be coupled to the demultiplexer arrangement and may be configured to assign each of the signal components to one of a plurality of logical channels within the RF domain to produce a plurality of assigned RF signals and to combine groups of the assigned RF signals corresponding to each of the second plurality of spatially-multiplexed signals to generate a second plurality of combined RF signals. The RF processing module may be coupled to the RF channelization arrangement and may be adapted to perform, for example, one or more of the following: splitting each of the combined RF signals; weighting the resultant split signals with a set of transmit weighting values to generate a plurality of transmit-weighted RF signals; and combining sets of the plurality of transmit-weighted RF signals to form a plurality of RF signals capable of being transmitted through a plurality of transmit antennas of the transmitter.

These and other features and advantages of some embodiments according to some aspects of the present invention may be appreciated from a review of the following detailed description, along with the accompanying figures in which like reference numerals refer to like parts throughout.

BRIEF DESCRIPTION OF THE DRAWINGS

FIGS. 1A-B show block diagrams illustrating a conventional multiple-input-multiple-output (MIMO) communication system.

FIGS. 2A-B show block diagrams illustrating an embodiment of a MIMO system according to some aspects of the present invention.

FIGS. 3A-B show block diagrams illustrating an embodiment of a MIMO system according to some aspects of the present invention.

FIGS. 4A-D show block diagrams illustrating embodiments of a MIMO system according to some aspects of the present invention.

DETAILED DESCRIPTION OF THE INVENTION

Figure 4A:
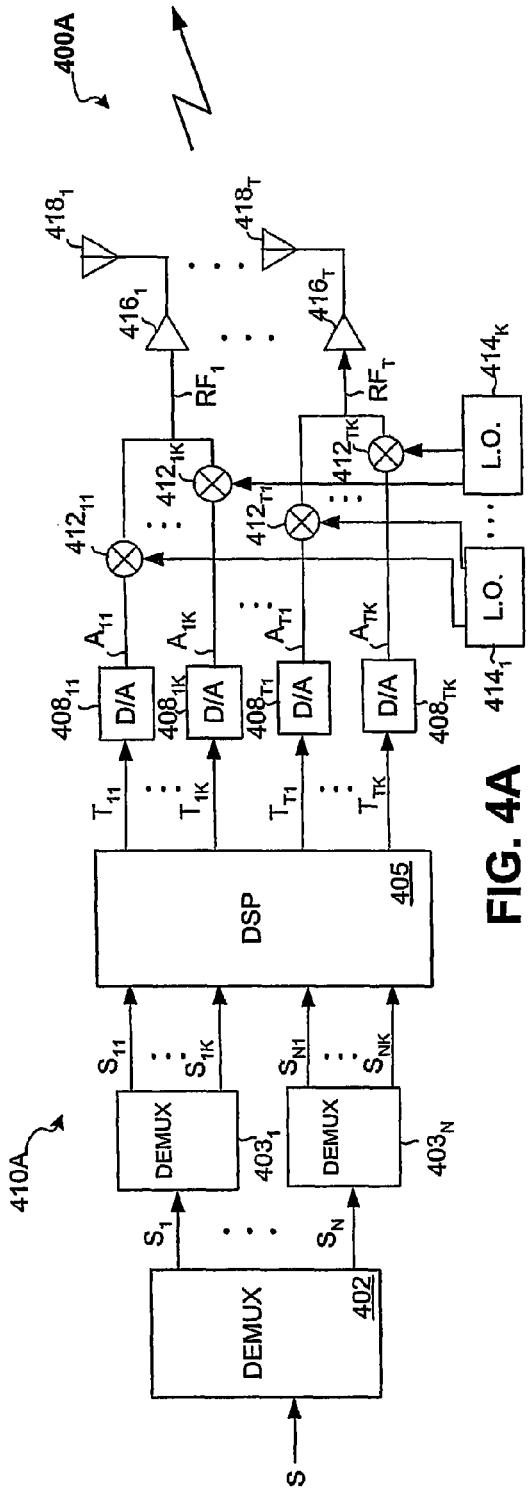

Some embodiments according to some aspects of the present invention may relate to channel bonding in multiple antenna communication systems.

Some embodiments according to some aspects of the present invention may be directed to systems and methods for data rate maximization with multi-antenna transmitters and/or receivers that employ, for example, one or more channel bonding strategies. Some embodiments according to some aspects of the present invention may provide, for example, a user signal, which is destined to be communicated between a multi-antenna transmitter and receiver and which may be allocated multiple logical channels in parallel for transmission and reception.

Some embodiments according to some aspects of the present invention may be applied within or in combination with, for example, multi-antenna transmitter and receiver structures adapted to process one or more information signals via baseband weighting and combining arrangements. Some embodiments according to some aspects of the present invention may find application when RF-based and baseband weighting and combining arrangements are incorporated within the same multi-antenna transmitter or receiver structure. Some embodiments according to some aspects of the present invention may find application when antenna selection is applied at the transmitter and/or the receiver, in combination with baseband signal weighting and combining. Some embodiments according to some aspects of the present invention may provide, for example, channel bonding techniques that may be implemented within spatially-multiplexed and "single-channel" communication systems that employ multi-antenna transmitters and receivers.

Some embodiments according to some aspects of the present invention may provide, for example, a signal transmission method for use with a transmitter equipped with a plurality of transmit antennas. The signal transmission method may include, for example, demultiplexing an input information signal into a plurality of signal components. Each of the signal components may then be assigned to one of a plurality of logical channels. The signal transmission method may further include, for example, weighting each of the signal components with transmit baseband weight values and combining ones of the resultant weighted signal components to form a plurality of transmit weighted signals. Some embodiments according to some aspects of the present invention may provide that each of the plurality of transmit weighted signals be assigned to one of the plurality of logical channels. Groups of the plurality of transmit weighted signals may then be combined to form a plurality of output signals which may be used, for example, to generate a plurality RF output signals.

Some embodiments according to some aspects of the present invention may provide, for example, a signal reception method for use with a multi-antenna receiver that includes a plurality of receive antennas adapted to produce a corresponding plurality of received RF signals in response to incidence of a transmitted RF signal originating from an input information signal. The signal reception method may include, for example, splitting each of the plurality of received RF signals into a plurality of signal components and identifying which one of a plurality of logical channels is assigned to each such signal component. The signal reception method may further include, for example, weighting each of the signal components with receive baseband weight values and combining ones of the resultant weighted signal components to form a plurality of receive weighted signals. Some embodiments according to some aspects of the present invention may provide that each of the receive weighted signals be assigned to one of the plurality of logical channels. The signal reception method may further include, for example, multiplexing the plurality of receive weighted signals to obtain an estimate of the input information signal.

Some embodiments according to some aspects of the present invention may be directed, for example, to a signal reception method for use with a multi-antenna receiver that includes a plurality of receive antennas adapted to produce a corresponding plurality of received RF signals in response to incidence of transmitted RF signal. The transmitted RF signal may originate, for example, from an input information signal composed of a set of spatially-multiplexed signals. The signal reception method may include, for example, splitting each of the plurality of received RF signals into a plurality of signal components and identifying which one of a plurality of logical channels is assigned to each of the signal components. Each of the signal components may be weighted with receive baseband weight values. Various ones of the resultant weighted signal components may be combined to form a plurality of receive weighted signals. Some embodiments according to some aspects of the present invention may provide that each of the receive weighted signals is assigned to one of the plurality of logical channels and is associated with one of the spatially-multiplexed signals. The signal reception method may further include, for example, multiplexing a group of the plurality of receive weighted signals corresponding to each of the spatially-multiplexed signals to form a plurality of multiplexed received signals, which may then be multiplexed to obtain an estimate of the input information signal.

Some embodiments according to some aspects of the present invention may also be directed, for example, to a signal transmission method for use with a transmitter equipped with a plurality of transmit antennas. The signal transmission method may include, for example, demultiplexing an input information signal into a first plurality of signal components representative of a corresponding second plurality of spatially-multiplexed signals. Each of the signal components may be assigned to one of a plurality of logical channels within the RF domain to produce a plurality of assigned RF signals. The signal transmission method may further include, for example, combining groups of the assigned RF signals corresponding to each of the second plurality of spatially-multiplexed signals to generate a second plurality of combined RF signals. Each of the combined RF signals may be split. The resultant split signals may be weighted with a set of transmit weighting values to generate a multiplicity of transmit-weighted RF signals. The signal transmission method also may contemplate, for example, combining sets of the multiplicity of transmit-weighted RF signals to form a plurality of RF output signals capable of being transmitted through the plurality of transmit antennas.

Some embodiments according to some aspects of the present invention may include, for example, a multi-antenna transmitter which includes a demultiplexer arrangement configured to produce a plurality of signal components in response to an input information signal. The transmitter may also include, for example, a digital signal processor operatively coupled to the demultiplexer arrangement. The digital signal processor may be operative to: (i) assign each of the signal components to one of a plurality of logical channels; (ii) weight each of the signal components with transmit baseband weight values and combine ones of the resultant weighted signal components to form a plurality of transmit weighted signals, each of the plurality of transmit weighted signals being assigned to one of the plurality of logical channels; and (iii) combine groups of the plurality of transmit weighted signals to form a plurality of baseband output signals. The transmitter may further include, for example, an RF processing arrangement configured to generate a set of RF output signals in response to the plurality of baseband output signals.

Some embodiments according to some aspects of the present invention may include, for example, a multi-antenna receiver that includes a plurality of receive antennas adapted to produce a corresponding plurality of received RF signals in response to incidence of a transmitted RF signal originating from an input information signal. The receiver may include, for example, an input RF processing arrangement operative to split each of the plurality of received RF signals into a plurality of signal components and to identify which one of a plurality of logical channels is assigned to each of the signal components. A digital signal processor, coupled to the input RF processing arrangement, may be operative to weight each of the signal components with receive baseband weight values and combine ones of the resultant weighted signal components to form a plurality of receive weighted signals. Some embodiments according to some aspects of the present invention may provide that each of the receive weighted signals be assigned to one of the plurality of logical channels. The receiver may further include, for example, an output multiplexer arrangement adapted to multiplex the plurality of receive weighted signals to obtain an estimate of the input information signal.

Some embodiments according to some aspects of the present invention may provide, for example, a multi-antenna receiver that includes a plurality of receive antennas adapted to produce a corresponding plurality of received RF signals in response to incidence of transmitted RF signal energy originating from an input information signal composed of a set of spatially-multiplexed signals. The receiver may include, for example, an input RF processing arrangement operative to split each of the plurality of received RF signals into a plurality of signal components and to identify which one of a plurality of logical channels is assigned to each of the signal components. The receiver may further include, for example, a digital signal processor coupled to the input RF processing arrangement. The digital signal processor may weight each of the signal components with receive baseband weight values and may combine ones of the resultant weighted signal components to form a plurality of receive weighted signals. Some embodiments according to some aspects of the present invention may provide that each of the receive weighted signals be assigned to one of the plurality of logical channels and be associated with one of the spatially-multiplexed signals. The receiver may further include, for example, an output multiplexing arrangement coupled to the digital signal processor, the output multiplexing arrangement (i) multiplexing a group of the plurality of receive weighted signals corresponding to each of the spatially-multiplexed signals to form a plurality of multiplexed received signals, and (ii) multiplexing the plurality of multiplexed received signals to obtain an estimate of the input information signal.

Some embodiments according to some aspects of the present invention may be directed, for example, to a multi-antenna transmitter that includes a demultiplexer arrangement operative to demultiplex an input information signal into a first plurality of signal components representative of a corresponding second plurality of spatially-multiplexed signals. The transmitter may include, for example, an RF channelization arrangement coupled to the demultiplexer arrangement. The RF channelization arrangement may be configured to (i) assign each of the signal components to one of a plurality of logical channels within the RF domain to produce a plurality of assigned RF signals, and (ii) combine groups of the assigned RF signals corresponding to each of the second plurality of spatially-multiplexed signals to generate a second plurality of combined RF signals. The transmitter may also include, for example, an RF output processing module, coupled to the RF channelization arrangement, adapted to split each of the combined RF signals and to weight the resultant split signals with a set of transmit weighting values to generate a multiplicity of transmit-weighted RF signals. The RF output processing module also may combine, for example, sets of the multiplicity of transmit-weighted RF signals to form a plurality of RF output signals capable of being transmitted through a plurality of transmit antennas of the transmitter.

Some embodiments according to some aspects of the present invention may provide that channel bonding be performed across a frequency domain, thus enabling operation within a plurality of frequency bandwidths (e.g., not necessarily contiguous frequency bandwidths) and enabling operation at an increased data rate. Each antenna at the transmitter or receiver may be equipped with, for example, a modulator or demodulator, respectively, capable of modulating/demodulating the applicable signal on a plurality of frequency carriers within a frequency band. For example, in accordance with the IEEE 802.11a standard (802.11a standard), if the user signal is allocated two distinct 20 MHz-wide frequency subchannels capable of individually transmitting 54 Mbps, then a total data rate of 108 Mbps is available to the user signal when two bonded channels are employed. A similar approach may be used when channel bonding is performed across multiple time slots.

Some embodiments according to some aspects of the present invention may provide that channel bonding be performed over a code domain (e.g., with CDMA-based systems) such that a given user signal is afforded access to a plurality of code sequences. For example, in the case of a system using code sequences individually yielding data rates of approximately 2 Mbps, assignment of two such sequences to a user signal may make available a channel-bonded data rate of 4 Mbps.

Some embodiments according to some aspects of the present invention may be directed to systems and methods that provide data rate maximization within multi-antenna systems that contemplate the use of various channel bonding techniques. To facilitate appreciation of some aspects of the present invention, an overview is initially provided of exemplary architectures of multi-antenna systems lacking the channel-bonding capabilities. The overview is followed by a detailed description of some of the channel-bonding approaches within the context of various types of multi-antenna communication systems according to some embodiments of the present invention.

I. Overview of Architecture of Multi-Antenna Systems

Spatial Multiplexing

According to some embodiments according to some aspects of the present invention, spatial multiplexing (SM) provides a mode of signal transmission predicated upon the use of multiple antennas at both a transmitter and a receiver in such a way that the bit rate of a wireless radio link may be increased without correspondingly increasing power or bandwidth consumption. In the case in which N antennas are used at both a transmitter and a receiver, an input stream of information symbols provided to the transmitter is divided into N independent substreams. Spatial multiplexing contemplates that each of these substreams will occupy the same "channel" (e.g., a time slot, a frequency or a code/key sequence) of the applicable multiple-access protocol. Within the transmitter, each substream is separately applied to the N transmit antennas and propagated over an intervening multipath communication channel to a receiver. The composite multipath signals are then received by a receive array of N receive antennas deployed at the receiver. At the receiver, a "spatial signature" defined by the N phases and N amplitudes arising at the receive antenna array for a given substream is then estimated. Signal processing techniques are then applied to separate the received signals, which permit the original substreams to be recovered and synthesized into the original input symbol stream. The principles of spatially-multiplexed communication and exemplary system implementations are further described in, for example, "Optimum combining for indoor radio systems with multiple users", by J. H. Winters, IEEE Transactions on Communications, vol. COM-35, no. 11, November 1987, which is hereby incorporated herein by reference in its entirety.

Conventional MIMO System

FIG. 1A-B show block diagrams illustrating a MIMO system 100. The MIMO system 100 includes a transmitter 110 depicted in FIG. 1A and a receiver 130 depicted in FIG. 1B. The transmitter 110 and receiver 130 include a set of T transmit RF chains and a set of R receive RF chains, respectively, which are configured to transmit and receive a group of N spatially-multiplexed signals. Within the system 100, the following is true: (i) T is greater than N and R is equal to N; (ii) T is equal to N and R is greater than N; or (iii) both T and R are greater than N.

Referring to FIG. 1A, an input signal S to be transmitted, which typically includes of a stream of digital symbols, is demultiplexed by demultiplexer 102 into N independent substreams $S_{1, 2}, \ldots, _N$. The substreams $S_{1, 2}, \ldots, _N$ are then sent to digital signal processor (DSP) 105, which generates a set of T output signals $T_{1, 2}, \ldots, _T$. The T output signals $T_{1, 2}, \ldots, _T$ are typically generated from the N substreams $S_{1, 2}, \ldots, _N$ by weighting (e.g., multiplying by a complex number) each of the N substreams $S_{1, 2}, \ldots, _N$ by T different weighting coefficients to form NT substreams. These N·T substreams are then combined to form the T output signals $T_{1, 2}, \ldots, _T$. The T output signals $T_{1, 2}, \ldots, _T$ are then converted to T analog signals $A_{1, 2}, \ldots, _T$ using a set of T digital-to-analog (D/A) converters 108. Each of the T analog signals $A_{1, 2}, \ldots, _T$ is then upconverted to the applicable transmit carrier RF frequency within a mixer 112 by mixing with a signal provided by a local oscillator 114. The resulting set of T RF signals (e.g., $RF_{1, 2}, \ldots, _T$) are then amplified by respective amplifiers 116 and transmitted by respective antennas 118.

Referring to FIG. 1B, the RF signals transmitted by the transmitter 110 are received by a set of R receive antennas 131 deployed at the receiver 130. Each of the R signals received by an antenna 131 is amplified by a respective low noise amplifier 133 and passed through a filter 135. The resultant filtered signals are then each downconverted from RF to baseband using mixers 137, each of which is provided with a signal from local oscillator 138. Although the receiver of FIG. 1B is configured as a homodyne receiver, a heterodyne receiver characterized by an intermediate IF frequency could also be used. The respective R baseband signals produced by the mixers 137 are then converted to digital signals using a corresponding set of R analog-to-digital (A/D) converters 140. The resulting R digital signals $D_{1, 2}, \ldots, _R$ are then weighted and combined using digital signal processor 142 to form N spatially-multiplexed output signals $S'_{1, 2}, \ldots, _N$ which comprise estimates of the transmitted signals $S_{1, 2}, \ldots, _N$. The N output signals $S'_{1, 2}, \ldots, _N$ are then multiplexed using a multiplexer 155 to generate an estimate 160 (S') of the original input signal S.

RF Weighting and Combining in
Spatially-Multiplexed Communication Systems

FIGS. 2A-B show an embodiment of a MIMO system according to some aspects of the present invention. Referring to FIGS. 2A-B, there is shown a block diagram of a MIMO communication system 200 including, for example, a transmitter 210 and a receiver 250 configured, for example, to effect signal weighting and combining within the RF domain in a manner disclosed in the United States patent applications, which are incorporated herein by reference in their entirety. In the implementation illustrated in FIGS. 2A-B, the transmitter 210 and receiver 250 may provide, for example, N-fold spatial multiplexing using N transmit/receive RF chains, even though more than N transmit/receive antennas may be respectively deployed at the transmitter 210 and the receiver 250. As illustrated, the transmitter 210 includes a set of MT transmit antennas 240 and the receiver 260 includes a set of MR receive antennas 260. Some embodiments according to some aspects of the present invention may provide that MT and/or MR are greater than or equal to N. For example, (i) MT is greater than N and MR is equal to N, (ii) MT is equal to N and MR is greater than N, or (iii) both MT and MR are greater than N.

As shown in FIG. 2A, some embodiments according to some aspects of the present invention provide that an input signal S to be transmitted be demultiplexed by demultiplexer 202 into N independent substreams $SS_{1, 2}, \ldots, _N$. The substreams $SS_{1, 2}, \ldots, _N$ are then converted to N analog substreams $AS_{1, 2}, \ldots, _N$ using a corresponding set of D/A converters 206. Next, the N analog substreams $AS_{1, 2}, \ldots, _N$ are upconverted to the applicable transmit carrier RF frequency using a set of mixers 212 provided with the signal produced by a local oscillator 214. The resultant N RF signals (e.g., $RF_{1, 2}, \ldots, _N$) are then each split MT ways by dividers 218 to form N*(MT) RF signals. These N*(MT) RF signals are each weighted using complex multipliers $226_{x,y}$, where x identifies a signal origination point at one of the N dividers 218 and y identifies a corresponding signal termination point at one of a set of MT combiners 230. The weighted RF signals are combined using the combiners 230, thus yielding a set of MT output signals. A corresponding set of MT amplifiers 234 then amplifies the MT output signals, the amplified output signals then being transmitted using the MT antennas 240. Some embodiments according to some aspects of the present invention may provide that the weighting values of the complex multipliers $226_{x,y}$ may be generated, for example, to maximize the signal-to-noise ratio (SNR) at an applicable receiver as described in, for example, U.S. patent application Ser. Nos. 10/835,255 and 60/467,295, which are incorporated herein by reference in their entirety. Some embodiments according to some aspects of the present invention may provide that weighting values be chosen, for example, to minimize one or more bit error rates (BERs) of the output signal at the receiver in a manner disclosed in U.S. patent application Ser. Nos. 10/891,443 and 60/488,845, which are incorporated herein by reference in their entirety.

Referring to FIG. 2B, the MT RF signals transmitted by the transmitter 210 are received by the set of MR receive antennas 260 deployed at the receiver 250. Each of the MR received signals is amplified by a respective low noise amplifier 264 and then split N ways by one of a set of MR dividers 268. The resulting MR*(N) split signals are then each weighted by respective weighting circuits $272_{x,y}$, where x identifies a signal origination point at one of the MR dividers 268 and y identifies a corresponding signal termination point at one of a set of N combiners 276. These weighted signals are then combined using the N combiners 276 to form a set of N signals, which are passed through a corresponding set of N filters 280. The resulting N filtered signals are then downconverted to baseband using a set of N mixers 282, each of which is provided with a carrier signal produced by a local oscillator 284. Although the receiver 250 is realized as a homodyne receiver in the embodiment of FIG. 2B, it could also be implemented as a heterodyne receiver characterized by an intermediate IF frequency. (In fact, some embodiments according to some aspects of the present invention may incorporate, for example, homodyne configurations and/or heterodyne configurations). The N baseband signals produced by the mixers 282 are then converted to digital signals via a corresponding set of N A/D converters 286. The N digital signals are then further processed using digital signal processor 288 to form the N spatially-multiplexed output signals $SS'_{1, 2}, \ldots, _N$, which are the estimates of the N independent substreams $SS_{1, 2}, \ldots, _N$. The N output signals $SS'_{1, 2}, \ldots, _N$ are then multiplexed via a multiplexer 292 to generate the output signal S', which is an estimate of the input signal S.

Some embodiments according to some aspects of the present invention may provide that the transmitter 210 and the receiver 250 are capable of implementing, within the RF domain, the same spatial weighting or linear combining schemes as are typically implemented at baseband via the system 100 as illustrated in FIG. 1. In addition, the DSP 288 of the receiver 250 may perform many other baseband signal processing operations potentially effected within the system 100 such as, for example, successive interference cancellation. See, e.g., "V-BLAST: An architecture for realizing very high data rates over the rich-scattering wireless channel", Proceedings of URSI ISSSE, pages 295-300 (September 1998), which is hereby incorporated herein by reference in its entirety. Some embodiments according to some aspects of the present invention may provide that the system 200 provide only N transmit/receive RF chains, even when substantially more than N transmit/receive antennas are deployed. Some embodiments according to some aspects of the present invention provide that, by performing the requisite weighting and combining at RF using relatively inexpensive components, for example, an N-fold spatially-multiplexed system having more than N transmit and receive antennas, but only N RF chains, can be realized at a cost similar to that of a system having N transmit and receive antennas. In some embodiments according to some aspects of the present invention, system performance may be improved through the use of additional antennas at relatively low cost.

Antenna Selection at RF in Spatially-Multiplexed Communication Systems

FIGS. 3A-B show block diagrams illustrating an embodiment of MIMO communication system 300 including a transmitter 310 and a receiver 350 that are configured to provide antenna selection according to some aspects of the present invention. As illustrated, the transmitter 310 and receiver 350 are configured to provide N-fold spatial multiplexing using N transmit/receive RF chains, even though more than N transmit/receive antennas may be respectively deployed at the transmitter 310 and receiver 350. Specifically, the transmitter 310 includes a set of MT transmit antennas 340 and the receiver 350 includes a set of MR receive antennas 360. Some embodiments according to some aspects of the present invention may provide that MT and/or MR are greater than or equal to N. For example, (i) MT is greater than N and MR is equal to N; (ii) MT is equal to N and MR is greater than N; or (iii) both MT and MR are greater than N.

As shown in FIG. 3A, an input signal S to be transmitted is demultiplexed by demultiplexer 302 into N independent substreams $SS_{1, 2 \ldots, N}$. The substreams $SS_{1, 2 \ldots, N}$ are then converted to N analog substreams $AS_{1, 2 \ldots, N}$ using a corresponding set of D/A converters 306. Next, the N analog substreams $AS_{1, 2 \ldots, N}$ are upconverted to the applicable transmit carrier RF frequency using a set of mixers 312 provided with the signal produced by a local oscillator 314. The resultant N RF signals (e.g., $RF_{1, 2 \ldots, N}$) are then each connected to a selected subset of N transmit antenna elements by a switch 318. The switch 318 connects N RF signals (e.g., $RF_{1, 2 \ldots, N}$) to a set of N transmit antennas from the MT available transmit antennas 340, thereby yielding a set of N output signals. A corresponding set of N amplifiers 334 then amplifies these N output signals, with the amplified output signals then being transmitted using the N selected transmit antennas 340. In another example, the amplifiers 334 may be located before the switch 318. Some embodiments according to some aspects of the present invention may provide that N amplifiers (e.g., only N amplifiers) are used instead of MT amplifiers in the case where a single amplifier is placed at each of the MT antennas. The N antennas are selected to, for example, minimize the BER of the output signal at the receiver. See, e.g., U.S. patent application Ser. Nos. 10/891,443 and 60/488,845, which are incorporated herein by reference in their entirety.

Referring to FIG. 3B, the N RF signals transmitted by the transmitter 310 are received by the set of MR receive antennas 360 deployed at the receiver 350. Each of the MR received signals is amplified by a respective low noise amplifier (LNA) 364. A subset of N of the resultant amplified signals is then connected to a set of N RF chains by a switch 376 to form a set of N RF signals, which are passed through a corresponding set of N filters 380. In another example, the LNAs 364 may be disposed after the switch 376 such that the total number of LNAs 364 used is N rather than MR. The resulting N filtered signals are then downconverted to baseband using a set of N mixers 382, each of which is provided with a carrier signal produced by a local oscillator 384. Although the receiver 350 is realized as a homodyne receiver in the embodiment of FIG. 3B, it could also be implemented as a heterodyne receiver characterized by an intermediate IF frequency. (In fact, some of the embodiments according to some aspects of the present invention may incorporate, for example, homodyne configurations and/or heterodyne configurations). The N baseband signals produced by the mixers 382 are then converted to digital signals via a corresponding set of N A/D converters 386. The N digital signals are then further processed using digital signal processor 388 to form the N spatially-multiplexed output signals $SS'_{1, 2 \ldots, N}$, which are the estimates of the N independent substreams $SS_{1, 2 \ldots, N}$. The N output signals $SS'_{1, 2 \ldots, N}$ are then multiplexed via a multiplexer 392 to generate the output signal S', which is an estimate of the input signal S.

II. Channel Bonding and Related Signal Processing Techniques for Use within Multi-Antenna Systems Some embodiments according to some aspects of the present invention may provide, for example, a system and a method for data rate maximization which employs channel bonding, together with various signal processing techniques, within multi-antenna transmitter and receiver structures. The techniques employed by some embodiments according to some aspects of the present invention may be applied, for example, to multi-antenna transmitter and receiver structures adapted to process one or more information signals via baseband weighting and combining arrangements. Some embodiments according to some aspects of the present invention may find application in cases in which both RF-based and baseband weighting and combining arrangements are incorporated within the same multi-antenna transmitter and/or receiver structure. Some embodiments according to some aspects of the present invention may find application when antenna selection is applied at the transmitter and/or the receiver, in combination with baseband signal weighting and combining.

Some embodiments according to some aspects of the present invention may provide that channel bonding techniques be practiced within a multi-antenna transmitter and/or receiver operating within a "single channel" system (e.g., a system lacking spatial multiplexing) or within the multi-antenna devices of a MIMO system configured for, for example, spatially-multiplexed operation or single-channel operation.

Some embodiments according to some aspects of the present invention may provide that a user signal destined to be communicated over a multi-antenna wireless system be allocated multiple logical channels in parallel for transmission and reception. Some embodiments according to some aspects of the present invention may provide that channel bonding be performed across a frequency domain. The system is then be capable of operating within a plurality of frequency bandwidths, that are not necessarily contiguous, to yield, for example, an increased data rate. Each antenna at the applicable transmitter/receiver is equipped with a modulator/demodulator capable of modulating/demodulating the user signal on a plurality of frequency carriers within a given frequency band. For example, if the user signal is allocated two distinct 20 MHz-wide frequency subchannels in accordance with the IEEE 802.11a standard, each of which is capable of transmitting 54 Mbps, then the total data rate available to the user with two bonded channels is 108 Mbps. The same principle applies if the user is assigned multiple time slots.

Some embodiments according to some aspects of the present invention provide that channel bonding be performed over the code domain to render a user capable of communicating over a plurality of code sequences (e.g., CDMA code sequences). For example, if the user is assigned two code sequences, each yielding a data rate of approximately 2 Mbps, then the total data rate available to the user with two bonded channels is 4 Mbps. In some embodiments according to some aspects of the present invention, where a matched filter detector is used at the applicable receiver, the performance of the two signal components sent via the two codes may be degraded (e.g., data rate performance is doubled at the expense of a decreased signal-to-noise ratio (SNR) with respect to each signal component). However, if a multi-user-detector (MUD) is used at the receiver, then detection of both signals may be accomplished without substantially degrading SNR.

Some embodiments according to some aspects of the present invention employing channel bonding will be described with reference to FIGS. 4-6. FIGS. 4-6 show block diagrams illustrating some embodiments according to some aspects of the present invention including, for example: a MIMO system using spatial multiplexing with baseband weighting and combining arrangements; a MIMO system using spatial multiplexing with RF-based and baseband weighting and combining arrangements; and a MIMO system using spatial multiplexing with antenna selection at the transmitter and/or the receiver, in combination with baseband signal weighting and combining. Some embodiments according to some aspects of the present invention may include, for example, multiple antennas deployed only at the transmit end or only at the receive end of a communication link. Some embodiments according to some aspects of the present invention may find application in single-channel systems (e.g., systems lacking spatial multiplexing).

Channel Bonding and Baseband Weighting and Combining

Figure 4B:
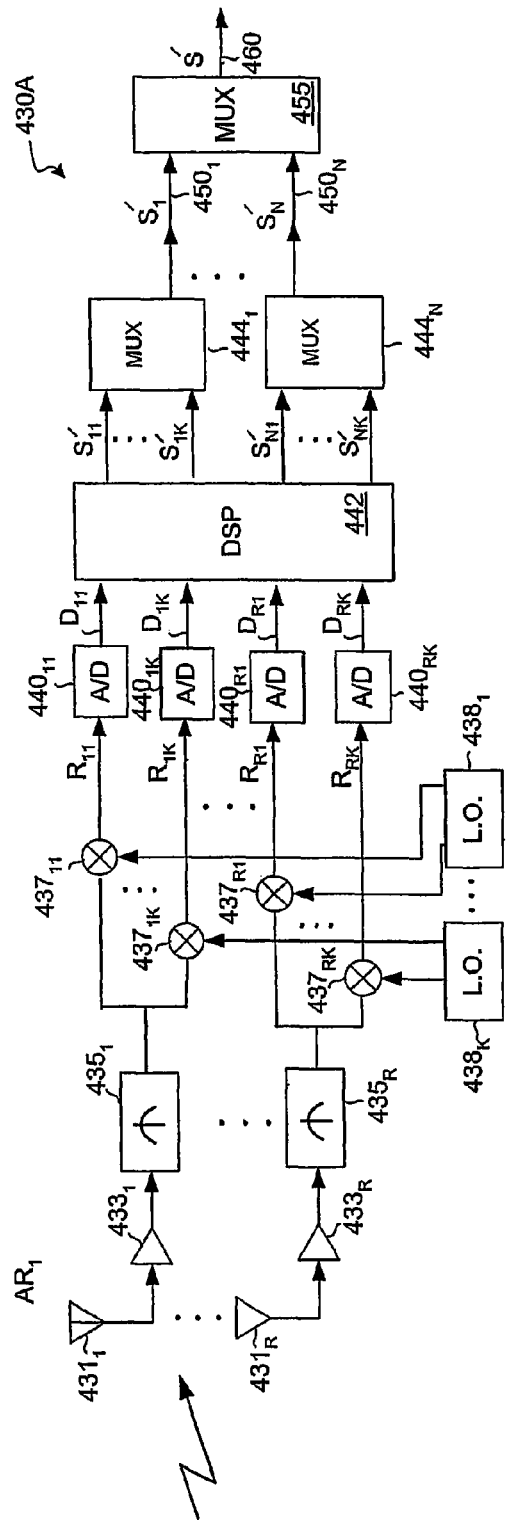

FIGS. 4A-D show block diagrams illustrating some embodiments of MIMO system 400A-B that provide N-fold spatial multiplexing with baseband weighting and combining in accordance with some aspects of the present invention. Some of the illustrated embodiments in FIGS. 4A-D employ channel bonding, for example, to achieve improved data rates. FIGS. 4A and 4B show block diagrams illustrating an embodiment of a system 400A that includes, for example, a first MIMO system 400A with a multi-antenna transmitter 410A and an associated multi-antenna receiver 430A. FIGS. 4C and 4D show block diagrams illustrating an embodiment of a system 400B that includes, for example, a second MIMO system 400B with a multi-antenna transmitter 410B and associated multi-antenna receiver 430B.

Referring to the transmitter 410A of the first MIMO system 400A as illustrated in FIG. 4A, an input signal S to be transmitted, which typically includes of a stream of digital symbols, is demultiplexed by demultiplexer 402 into N independent substreams $S_{1, 2}, \ldots, _N$. The demultiplexing operation effected by the demultiplexer 402 assists in the implementation of N-fold spatial multiplexing. Each of the substreams $S_{1, 2}, \ldots, _N$ is then demultiplexed by one of a set of N demultiplexers 403 into K independent substreams. The demultiplexing operation performed by each demultiplexer 403 effectively allocates a plurality of K logical channels to each spatially-multiplexed substream such that the data rate of each substream is increased by K-fold. In some embodiments according to some aspects of the present invention, one logical channel corresponds to a particular frequency bandwidth in which the bandwidths of two distinct logical channels do not overlap. Some embodiments according to some aspects of the present invention may provide, for example, that the substreams $S_{11, 21}, \ldots, _{N1}$ be assigned to logical channel 1, the substreams $S_{12, 22}, \ldots, _{N2}$ be assigned to logical channel 2, and so on. In this way, the overall data rate is increased by a factor of N*K.

Referring to FIG. 4A, the substreams $S_{11, 21}, \ldots, _{N1}, \ldots _{1K}, \ldots, _{NK}$ are sent to a digital signal processor (DSP) 405, which generates a set of (T*K) output signals $T_{11, 12}, \ldots, _{1K}, \ldots, _{T1}, \ldots _{TK}$. In some embodiments according to some aspects of the present invention, the T output signals $T_{1i, 2i}, \ldots, _{Ti}$ corresponding to the $i^{th}$ logical channel are typically generated from the N substreams $S_{1i, 2i}, \ldots, _{Ni}$ by weighting (e.g., multiplying by a complex number) each of the N substreams $S_{1i, 2i}, \ldots, _{Ni}$ by T different weighting coefficients, thereby forming (N*T) substreams. In the case in which N=T, the weighting operation performed by the DSP 405 may be optional. Some embodiments according to some aspects of the present invention may provide that the T weighting coefficients are, in general, dependent upon the propagation channel path gains corresponding to the $i^{th}$ logical channel. The (N*T) substreams are then combined to form the T output signals $T_{1i, 2i}, \ldots, _{Ti}$. In some embodiments according to some aspects of the present invention, the operation is performed independently for each logical channel i=1, ..., K, and produces a total set of (T*K) output signals. Some embodiments according to some aspects of the present invention provide that the set of T output signals $T_{1i, 2i}, \ldots, _{Ti}$ corresponding to the $i^{th}$ logical channel are obtained on the basis of the set of N input substreams $S_{1i, 2i}, \ldots, _{Ni}$ also corresponding to the $i^{th}$ logical channel. Some embodiments according to some aspects of the present invention provide that the "mixing" of signals across logical channels does not occur and that each logical channel may be processed independently and in parallel with respect to other logical channels. The (T*K) output signals $T_{11, 12}, \ldots, _{1K}, \ldots, _{T1}, \ldots _{TK}$ are then converted to (T*K) analog signals $A_{11, 12}, \ldots, _{1K}, \ldots, _{T1}, \ldots _{TK}$ using a set of (T*K) digital-to-analog (D/A) converters 408.

In some embodiments according to some aspects of the present invention, each of the T analog signals $A_{1i, 2i}, \ldots, _{Ti}$ (i=1, ..., K) is then upconverted to the applicable transmit carrier RF frequency corresponding to the $i^{th}$ logical channel via a mixer 412 by mixing each of the T analog signals with a signal provided by a local oscillator $414_i$. In some embodiments according to some aspects of the present invention, the operation is performed independently for each logical channel i=1, ..., K, and is achieved by adjusting each local oscillator $414_1, \ldots, _K$ to a different transmit carrier RF frequency such that, for example, the signals transmitted on different logical channels do not overlap in the frequency domain. The set of K upconverted signals assigned to be delivered from the same transmit antenna 418 are then combined to form one RF signal $RF_j$, j=1, ..., T. Each RF signal is composed of K components, each of which is upconverted to a different carrier frequency. The resulting set of T RF signals (e.g., $RF_{1, 2, \ldots, T}$) are then amplified by respective amplifiers 416 and transmitted by respective antennas 418. Some embodiments according to some aspects of the present invention provide that the amplifiers 416 are each operative to amplify a signal occupying multiple frequency bands of equal bandwidth in which each band is centered upon a carrier of different frequency.

In some embodiments according to some aspects of the present invention, the transmitter 410A and receiver 430A of the first MIMO system 400A are configured to operate in accordance with the 802.11a standard. In some embodiments according to some aspects of the present invention, the channelization scheme for this standard accommodates twelve 20 MHz-wide channels within a 300 MHz total bandwidth in the 5-6 GHz frequency band. In some cases, when channel bonding is not employed, a user signal may only be allocated a single logical channel corresponding to a channel bandwidth of 20 MHz. Thus, only one local oscillator 414 is used and the transmit carrier RF frequency corresponds to the center frequency of the assigned logical channel. See, e.g., FIG. 1A. By employing channel bonding, up to K logical channels may be allocated to the user signal according to some embodiments in accordance with some aspects of the present invention. In an exemplary embodiment according to some aspects of the present invention, the allocated set of up to K channels is selected from a total of twelve available channels, for example, and are not necessarily contiguous. The user signal may be demultiplexed into K components that are upconverted to K different transmit carrier RF frequencies, each of which may correspond to the center frequency of one of the K allocated logical channels.

Referring to the receiver 430A of FIG. 4B, the RF signals transmitted by the transmitter 410A are received by a set of R receive antennas 431 deployed at the receiver 430A. Each of the R signals received by an antenna 431 is amplified by a respective low noise amplifier 433 and passed through a filter 435. The filter 435 may span, for example, all the frequency bandwidths occupied by the transmitted signal, including, for example, all bonded channels. In some embodiments according to some aspects of the present invention, the filter 435 is designed to span the entire available bandwidth (e.g., all twelve channels defined by an 802.11a implementation). In some embodiments according to some aspects of the present invention, the filter 435 covers only the bonded channels used at the transmitter 410A.

The resultant filtered signals are then each split into K components, each of which corresponds to a different logical channel 1, ..., K. Each one of these K components corresponding to the $i^{th}$ logical channel is downconverted from RF to baseband using a mixer 437. As shown, each mixer 437 is also provided with a signal from a local oscillator $438_i$, which is adjusted to the RF carrier frequency corresponding to the $i^{th}$ logical channel. This produces a set of (R*K) baseband signals, $R_{11, 12} \ldots, _{1K}, \ldots, _{R1}, \ldots _{RK}$ which are then converted to digital signals using a corresponding set of (R*K) analog-to-digital (A/D) converters 440. The resulting (R*K) digital signals $D_{11, 12} \ldots, _{1K}, \ldots, _{R1}, \ldots _{RK}$ are then weighted and combined using digital signal processor 442 to form (N*K) output signals $S'_{11, 21} \ldots, _{N1}, \ldots _{1K}, \ldots, _{NK}$.

The N output signals $S'_{1i, 2i} \ldots, _{Ni}$ corresponding to the $i^{th}$ logical channel are typically generated from the R digital signals $D_{1i, 2i} \ldots, _{Ri}$ by weighting (e.g., multiplying by a complex number) each of the R digital signals $D_{1i, 2i} \ldots, _{Ri}$ by N different weighting coefficients to form a set of (N*R) signals. Some embodiments according to some aspects of the present invention may provide that the N weighting coefficients are, in general, dependent upon the propagation channel path gains corresponding to the $i^{th}$ logical channel. The (N*R) signals are then combined to form the N output signals $S'_{1i, 2i} \ldots, _{Ni}$ corresponding to the $i^{th}$ logical channel. This operation may be independently performed for each logical channel i=1, ..., K, and a total set of (N*K) output signals may be produced. Some embodiments according to some aspects of the present invention may provide that the set of N output signals $S'_{1i, 2i} \ldots, _{Ni}$ corresponding to the $i^{th}$ logical channel are obtained based upon only the set of R input digital signals $D_{1i, 2i} \ldots, _{Ri}$ which also correspond to the $i^{th}$ logical channel. In some embodiments according to some aspects of the present invention, there may be no mixing of signals across individual logical channels, and each logical channel may be processed independently and in parallel with respect to the remaining logical channels. The (N*K) output signals are then grouped into N sets of K signals and fed to N multiplexers 444, thereby forming N spatially-multiplexed output signals (450) $S'_{1, 2} \ldots, _N$ comprising estimates of the transmitted signals $S_{1, 2} \ldots, _N$. The N output signals $S'_{1, 2} \ldots, _N$ are then multiplexed using a multiplexer 455 to generate an estimate 460 (S') of the original input signal S.

During operation of the system 400A of FIG. 4, the values of the transmit and receive baseband weights used in DSP blocks 405 and 442 are updated on the basis of estimated channel information pertinent to all K logical channels. Channel estimation may be performed, for example, for all K logical channels by sending training sequences in parallel over all K logical channels. The K sets of transmit and receive baseband weights are then determined in parallel for the associated K logical channels. Some embodiments according to some aspects of the present invention may provide that the transmit/receive baseband weights (generally complex numbers) associated with the $i^{th}$ of the K logical channels are a function of the propagation channel path gains corresponding to the $i^{th}$ logical channel (e.g., only a function of the propagation channel path gains corresponding to the $i^{th}$ logical channel).

FIGS. 4C and 4D show an embodiment of a MIMO system 400B according to some aspects of the present invention. In FIGS. 4A-4D, like reference numerals are used to identify system components of substantially identical structure or function. In this regard, the baseband combining weights in DSP blocks 405 and 442 depicted in FIGS. 4C-4D are computed in the same manner as was described with reference to FIGS. 4A-4B. However, the MIMO system 400B of FIGS. 4C-4D differs from the MIMO system 400A in the manner in which upconversion to and downconversion from the K different RF frequency carriers are effected. As may be appreciated by reference to FIGS. 4C-4D, the MIMO system 400B employs K-fold fewer A/D and D/A elements than the system 400A since, for example, a single such element is provided for each RF chain.

Figure 7:
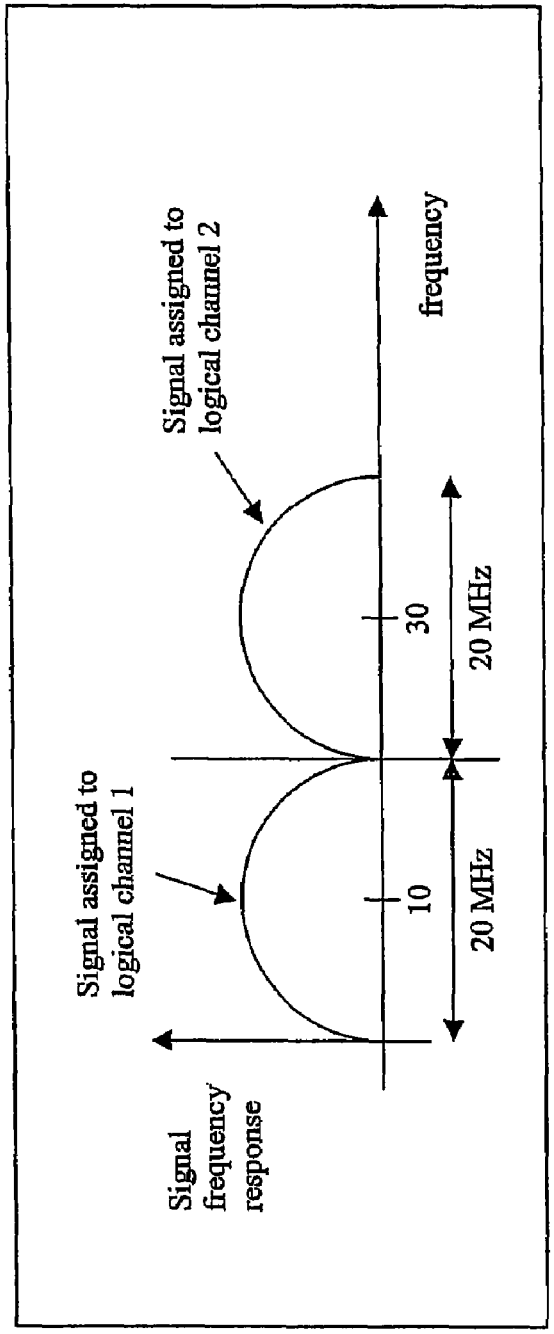
FIG. 7 shows an embodiment of a signal response according to some aspects of the present invention.

Turning now to FIG. 4C, processing within the transmitter 410B proceeds in a fashion substantially similar to that previously described with reference to the transmitter 410A until the signals $T_{11, 12} \ldots, _{1K}, \ldots, _{T1}, \ldots _{TK}$ are generated by the DSP 405. At this point, the signals corresponding to different logical channels are modulated at baseband to a different center frequency by using mixers 412, each of which is provided with a signal from local oscillators 414. In some embodiments according to some aspects of the present invention, some implementations may be in compliance with the 802.11a standard. For example, signals assigned to the $i^{th}$ logical channel could, for example, be centered around a baseband frequency of 10 MHz, while signals assigned to logical channel j≠i could, for example, be centered around a baseband frequency of 30 MHz. Since signals compliant with the 802.11a standard are 20 MHz-wide, signals assigned to different logical channels do not overlap in the frequency domain. This principle is illustratively represented by the signal response diagram 700 of FIG. 7 according to an embodiment in accordance with some aspects of the present invention. FIG. 7 illustrates an example of a signal response of various logical channels as a function of frequency. As is further clarified in FIG. 7, with respect to the system 400B of FIGS. 4C-4D, for example, the signals assigned to various logical channels are distinguished at baseband and modulated by a single RF frequency. This contrasts with the approach taken with respect to the system 400A as illustrated in FIGS. 4A-4B, for example, pursuant to which signals assigned to various logical channels occupy the same baseband frequency and are distinguished in the RF domain.

Referring to FIG. 4C, each of the T sets of K differently-centered baseband signals assigned to be sent out of one of the T transmit antennas 418 are produced by a set of K mixers 412 and combined prior to being passed through one of the T digital-to-analog (D/A) converters 408. The resulting T analog signals, $A_{1, 2}, \ldots, _T$ produced by the (D/A) converters 408 are then each upconverted to the same transmit carrier RF frequency within associated mixers 415 by mixing with a signal provided by a local oscillator $414_{K+1}$. The T RF signals $RF_1, \ldots, _T$, are then amplified by corresponding RF amplifiers 416 and transmitted by corresponding antennas 418.

Referring to FIG. 4D, processing within the receiver 430B proceeds in a fashion substantially similar to that previously described with reference to the receiver 430A until the point at which the received signals reach the filters 435. The R filtered signals produced by the filters 435 are downconverted from RF to baseband using a set of mixers 437, each of which is provided with a signal from a single local oscillator $438_{K+1}$. A set of R baseband signals, $R_{1, 2}, \ldots, _R$ (containing signal components centered at different baseband frequencies) is produced. These R baseband signals are then converted to digital signals using a corresponding set of R analog-to-digital (A/D) converters 440. The digital output signals produced by the (A/D) converters 440 are then each split into K components, one corresponding to each of the K logical channels. Each of the K components of each such output signal is then modulated by a mixer 441, each of which is provided with a signal from one of K local oscillators $438_1, \ldots, _K$. In some embodiments according to some aspects of the present invention, this operation results in re-centering of all the digital signals to the same baseband center frequency, and produces (R*K) digital signals $D_{11, 12}, \ldots, _{1K}, \ldots, _{R1}, \ldots _{RK}$ equivalent to the (R*K) digital signals $D_{11, 12} \ldots, _{1K}, \ldots, _{R1}, \ldots _{RK}$ depicted in FIG. 4B. Further processing steps within the receiver 430B of FIG. 4D are equivalent to those described with reference to FIG. 4B.

Channel Bonding with Both Baseband and RF Weighting and Combining

Figure 5A:
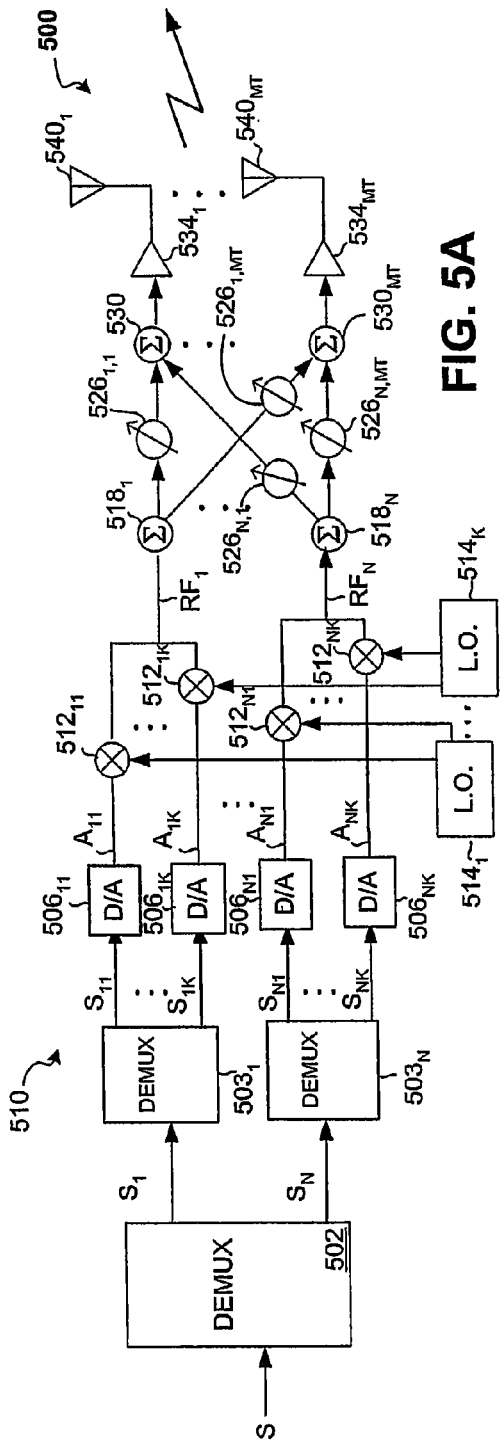
FIGS. 5A-B show block diagrams illustrating an embodiment of a MIMO system according to some aspects of the present invention.
Figure 5B:
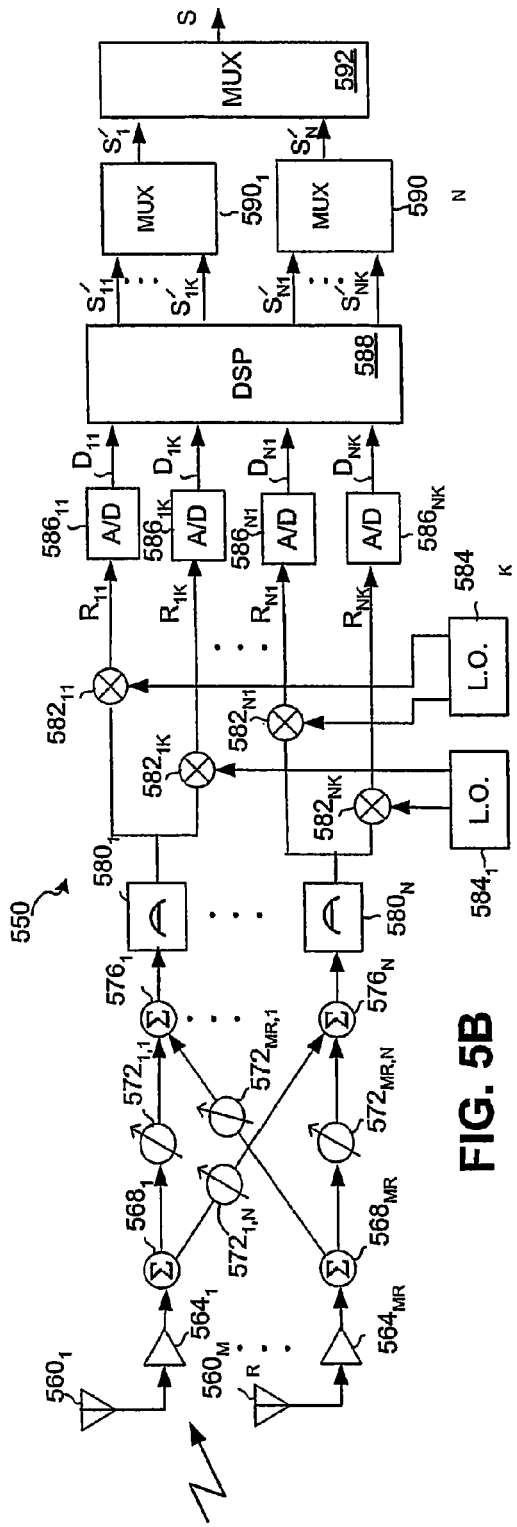

FIGS. 5A-B show block diagrams illustrating an embodiment of a MIMO system 500 that effects N-fold spatial multiplexing together with RF and baseband weighting and combining in accordance with some aspects of the present invention. The system 500 of FIGS. 5A-B is similar to that of the system 200 of FIGS. 2A-B, but additionally employs channel bonding in accordance with some embodiments according to some aspects of the present invention. In at least some instances, improved data rates are achieved. The weighting and combining of signals in the RF domain within the system 500 advantageously enables N-fold spatial multiplexing to be implemented using only N transmit/receive RF chains even though more than N transmit/receive antennas are respectively deployed at the transmitter 510 and receiver 550. The system 500 of FIGS. 5A-B is similar in a number of ways to the architecture of the system 400A of FIGS. 4A-B, for example, in terms of the number of A/Ds and D/As utilized to effect analog/digital and digital/analog conversion, respectively. It would of course also be possible to implement another embodiment of the system 500 of FIG. 5 according to some aspects of the present invention using an architecture closely resembling that of the system 400B depicted in FIGS. 4C-D. One skilled in the art would be readily able to effect such implementation in view of the discussion below and the description of the system 400B previously provided with reference to FIGS. 4C-D.

Referring to the transmitter 510 of FIG. 5A, an input signal S to be transmitted (e.g., a stream of digital symbols) is demultiplexed by demultiplexer 502 into N independent substreams $S_{1, 2} \ldots, _N$. The substreams $S_{1, 2} \ldots, _N$ are then each demultiplexed into K independent substreams by a set of N demultiplexers 503. The (N*K) substreams $S_{11, 21} \ldots, _{N1}, \ldots _{1K}, \ldots, _{NK}$ are then converted to (N*K) analog signals $A_{11, 12} \ldots, _{1K}, \ldots, _{N1}, \ldots _{NK}$ using a set of (N*K) digital-to-analog (D/A) converters 506.

Some embodiments according to some aspects of the present invention may provide that each of the N analog signals $A_{1i, 2i} \ldots, _{Ni}$ is then upconverted, within a mixer 512, to the applicable transmit carrier RF frequency corresponding to the $i^{th}$ logical channel by mixing the analog signal with a signal provided by a local oscillator $514_i$. This operation may be done independently for each logical channel i=1, . . . , K by adjusting each of the local oscillators $514_1, \ldots, _K$ to different transmit carrier RF frequencies such that signals transmitted on different logical channels do not overlap in the frequency domain. The set of K upconverted signals originating from the same spatially-multiplexed signal are then combined to form one RF signal $RF_j$, j=1, . . . , N. Each of the N RF signals includes, for example, K components, which have each been upconverted to different carrier frequencies.

The resultant N RF signals (e.g., $RF_{1, 2} \ldots, _N$) are then each split MT ways by dividers 518. N*(MT) RF signals are formed. The N*(MT) RF signals are each weighted using complex multipliers $526_{x,y}$, where x identifies a signal origination point at one of the N dividers 518 and y identifies a corresponding signal termination point at one of a set of MT combiners 530 (an exemplary approach for determining the values of the complex multipliers $526_{x,y}$ is provided below). The weighted RF signals produced by the complex multipliers $526_{x,y}$ are combined using the combiners 530, thereby yielding a set of MT output signals. A corresponding set of MT amplifiers 534 then amplifies the MT output signals, with the amplified output signals then being transmitted using the MT antennas 540. Some embodiments according to some aspects of the present invention may provide that the amplifiers 534 are operative to amplify signals occupying multiple frequency bands of equal bandwidth, each band being centered upon a carrier of different frequency.

Referring to the receiver 550 of FIG. 5B, the MT RF signals transmitted by the transmitter 510 are received by the set of MR receive antennas 560 deployed at the receiver 550. Each of the MR received signals is amplified by a respective low noise amplifier 564 and then split N ways by one of a set of MR dividers 568. The resulting MR*(N) split signals are then each weighted by respective weighting circuits 572$_{x,y}$ where x identifies a signal origination point at one of the MR dividers 568 and y identifies a corresponding signal termination point at one of a set of N combiners 576. These weighted signals are then combined using the N combiners 576 to form a set of N signals, which is passed through a corresponding set of N filters 580. In some embodiments according to some aspects of the present invention, each filter 580 is of a bandwidth spanning, for example, all the frequency bandwidths occupied by the transmitted signal, including, for example, bonded channels. The filtered signals produced by the filters 580 are then each split into K components, each of which corresponds to a different logical channel 1, . . . , K. The component corresponding to the $i^{th}$ logical channel is down-converted from RF to baseband using a mixer 582. In some embodiments according to some aspects of the present invention, each mixer 582 is provided with a signal from a local oscillator 584$_i$ adjusted to the RF carrier frequency corresponding to the $i^{th}$ logical channel. The set of (N*K) baseband signals, $R_{11, 12} \ldots, _{1K}, \ldots, _{N1}, \ldots _{NK}$ generated by the mixers 582 are then converted to digital signals using a corresponding set of (N*K) analog-to-digital (A/D) converters 586. The resulting (N*K) digital signals $D_{11, 12} \ldots, _{1K}, \ldots, _{N1}, \ldots _{NK}$ are then weighted and combined using digital signal processor 588, thereby forming (N*K) output signals $S'_{11, 21} \ldots, _{N1}, \ldots _{1K}, \ldots, _{NK}$. The N output signals $S'_{1i, 2i} \ldots, _{Ni}$ corresponding to the $i^{th}$ logical channel are typically generated from the N digital signals $D_{1i, 2i} \ldots, _{Ni}$ by weighting (e.g., multiplying by a complex number) each of the N digital signals $D_{1i, 2i} \ldots, _{Ni}$ by N different weighting coefficients to form N*N signals. In some embodiments according to some aspects of the present invention, the N weighting coefficients are, in general, dependent upon the propagation channel path gains corresponding to the $i^{th}$ logical channel. The N*N signals are then combined to form the N output signals $S'_{1i, 2i} \ldots, _{Ni}$. Since this operation can be done independently for each logical channel i=1, . . . , K, a total set of (N*K) output signals are produced.

Some embodiments according to some aspects of the present invention may provide that the set of N output signals $S'_{1i, 2i} \ldots, _{Ni}$ corresponding to the $i^{th}$ logical channel are obtained based, for example, exclusively upon the set of N input digital signals $D_{1i, 2i} \ldots, _{Ni}$ also corresponding to the $i^{th}$ logical channel. Some embodiments according to some aspects of the present invention may provide that signals are not mixed across logical channels and that each logical channel can be processed independently and in parallel with all other logical channels. The (N*K) output signals generated by the digital signal processor 588 are then grouped into N sets of K signals and fed to N multiplexers 590. The N spatially-multiplexed output signals $S'_{1, 2} \ldots, _{N}$ formed by the multiplexers 590 comprise estimates of the transmitted signals $S_{1, 2} \ldots, _{N}$, and are, in turn, multiplexed by multiplexer 592 to generate an estimate S' of the original input signal S.

Some embodiments according to some aspects of the present invention provide for computing values of the RF transmit weights 526, RF receive weights 572 and baseband receive weights utilized within the digital signal processor 588. In an exemplary case in which channel bonding is not employed, U.S. patent application Ser. Nos. 10/835,255, 60/467,295, 10/891,443 and 60/488,845, for example, which are incorporated herein by reference in their entirety, describe exemplary approaches for computing RF weighting values in multi-antenna systems under different performance criterion (e.g., maximization of SNR and minimization of BER, respectively). Some embodiments according to some aspects of the present invention contemplate that the weight coefficients are typically defined to be frequency-independent and, hence, can be constant values over a particular channel domain. Some embodiments according to some aspects of the present invention may provide that the weight coefficients can generally be invariant over the user signal frequency bandwidth, tap delay profile, time impulse response, or Rake finger profile of the applicable channel.

When channel bonding is introduced according to some embodiments in accordance with some aspects of the present invention, the RF weights typically comprise coefficients which are constant over a particular channel domain encompassing the multiple logical channels assigned to the user. Some embodiments according to some aspect of the present invention provide that the RF weight coefficients can generally be invariant across the bandwidth of the logical channels assigned to the user (e.g., the "aggregated channel"), the tap delay profile of the aggregated channel, the time impulse response of the aggregated channel, or the Rake fingers profile of the aggregated channel. Some embodiments according to some aspects of the present invention provide that the RF weights cannot generally be separately dependent upon each logical channel, and can instead be dependent upon and common to all logical channels assigned to the user. In this case, the RF weights are chosen to maximize the signal-to-noise ratio or minimize the output bit error rate of the applicable receiver as computed over the aggregated channel.

In accordance with some embodiments according to some aspects of the present invention, an example is provided of the computation of the RF and baseband weighting values utilized within an implementation of the spatially-multiplexed MIMO system 500 configured for operation in compliance with the 802.11a standard. In the example, it may be assumed that the MIMO system 500 is disposed to process a spatially-multiplexed signal using the channel bonding techniques in accordance with some embodiments according to some aspects of the present invention. In addition, it may be assumed that both RF and baseband weighting and signal combining are performed in the manner described, for example, in U.S. patent application Ser. Nos. 10/835,255 and 60/467,295, which are incorporated herein by reference in their entirety, to maximize the output signal-to-noise ratio of the receiver 550. In view of the examples below and the other teachings herein, one skilled in the art will readily appreciate the manner in which the above-described weighting scheme may be modified when channel bonding is employed in accordance with some embodiments according to some aspects of the present invention.

Some embodiments according to some aspects of the present invention may provide the following expression for the baseband digital signal, $D_{i,j}$, which exists at the $i^{th}$ RF branch of receiver 550 and corresponds to logical channel j, at tone k:

$$D_{i,j}(k) = \underline{u}_i^H \cdot \underline{r}_j(k) = \underline{u}_i^H H_j(k) \cdot V \cdot \underline{s}_j(k) + \underline{u}_i^H \underline{n}_j(k) \qquad (1.)$$

where $u_i$ represents the receive RF weights 572 (MR×1 vector) of the $i^{th}$ of the N RF branches of the receiver 550, $r_j(k)$ is the component of the received signal vector (MR×1) corresponding to the $j^{th}$ logical channel at tone k, $H_j(k)$ is the MR×MT channel matrix corresponding to the $j^{th}$ logical channel at tone k, $V=[\underline{v}_1, \ldots, \underline{v}_N]$ is the MT×N transmit RF weight matrix representative of the transmit RF weights 526, $\underline{s}_j(k)=[s_{1,j}(k), \ldots, s_{N,j}(k)]^T$ is the N×1 vector of spatially-multiplexed transmitted symbols corresponding to the $j^{th}$ logical channel at tone k and $\underline{n}_j(k)$ is the MR×1 noise vector corresponding to the $j^{th}$ logical channel at tone k. The transmit and receive RF weights (V and U=[$u_1$, . . . , $u_N$]) can be independent of the frequency (e.g., the tone k) and can also be independent of the logical channel.

The SNR at the $i^{th}$ RF branch corresponding to logical channel j, at tone k, where the desired signal is $s_{i,j}(k)$, may be expressed as:

$$SNR_{i,j,k} = \sigma_s^2 \frac{\underline{u}_i^H H_j(k) \cdot \underline{v}_i \cdot \underline{v}_i^H H_j^H(k) \underline{u}_i}{\sigma^2 \underline{u}_i^H \underline{u}_i} \quad (2.)$$

where $\sigma_s^2 = E[s_{i,j}(k) \cdot s_{i,j}^*(k)]$ and $\sigma^2 I_{MR} = E[\underline{n}_j(k) \cdot \underline{n}_j^H(k)]$. It is noted that Gaussian noise is considered in the expression of SNR given by Equation (2) and not the interference due to other spatially-multiplexed signals.

The average SNR, as taken across all (e.g., $N_t$) frequency tones and across all (e.g., K) aggregated logical channels, is given by $$\overline{SNR}_i = \sigma_s^2 \frac{\underline{u}_i^H \left( \sum_{k=1}^{N_t} \sum_{j=1}^{K} H_j(k) \cdot \underline{v}_i \cdot \underline{v}_i^H H_j^H(k) \right) \underline{u}_i}{\sigma^2 \underline{u}_i^H \underline{u}_i} \quad (3.)$$

which can be alternatively written as:

$$\overline{SNR}_i = \sigma_s^2 \frac{\underline{v}_i^H \left( \sum_{k=1}^{N_t} \sum_{j=1}^{K} H_j^H(k) \cdot \underline{u}_i \cdot \underline{u}_i^H H_j(k) \right) \underline{v}_i}{\sigma^2 \underline{u}_i^H \underline{u}_i} \quad (4.)$$

In some embodiments according to some aspects of the present invention, the solutions for $u_i$ (e.g., for the receive RF weights 572) and for $v_i$ (i=1, . . . , N) (e.g., for the transmit RF weights 526) are obtained by solving a joint problem. Specifically, the solution for $u_i$, given $v_i$, that maximizes the quantity in Equation (3) is the eigenvector of the matrix $$\left( \sum_{k=1}^{N_t} \sum_{j=1}^{K} H_j(k) \cdot \underline{v}_i \cdot \underline{v}_i^H H_j^H(k) \right)$$

corresponding to the largest eigenvalue. The other aspect of the joint problem relates to determining the solution for $v_i$, given $u_i$, that maximizes the quantity in Equation (4), which is equivalent to finding the eigenvector of the matrix $$\left( \sum_{k=1}^{N_t} \sum_{j=1}^{K} H_j^H(k) \cdot \underline{u}_i \cdot \underline{u}_i^H H_j(k) \right)$$

corresponding to the largest eigenvalue.

Once the transmit RF weights 526 and the receive RF weights 572 have been computed pursuant to Equations (3) and (4) as described above, the baseband weights utilized within the DSP 588 are individually computed for each tone of each logical channel. The N digital signals $D_{1j, 2j}$ . . . , $_{Nj}$ corresponding to logical channel j and tone k are gathered in an N×1 vector $\underline{D}_j(k)$. This vector $\underline{D}_j(k)$ is then processed with an N×N matrix of baseband weights $W_j^H(k)$ to separate and recover the N spatially-multiplexed signals $S'_{1j, 2j}$ . . . , $_{Nj}$ corresponding to logical channel j and tone k.

$$\underline{D}_j(k) = U^H H_j(k) \cdot V \cdot \underline{s}_j(k) + U^H \underline{n}_j(k)$$

$$\underline{S}'_j(k) = W_j^H(k) \underline{D}_j(k)$$

where $W_j^H(k)$ may be determined using, for example, the minimum mean squared error (MMSE) solution (e.g., the Wiener-Hopf solution). See also, e.g., S. Haykin, Adaptive Filter Theory, $3^{rd}$ Ed., Prentice Hall, 1996:

$$W_j(k) = \left( H_j''(k) H_j''^H(k) + \frac{\sigma^2}{\sigma_s^2} U^H U \right)^{-1} H_j''(k) \quad (5.)$$

where $$H_j''(k) = U^H H_j(k) \cdot V.$$

Some embodiments according to some aspects of the present invention may provide for the computation of the RF and baseband weighting values utilized within an implementation of the spatially-multiplexed MIMO system 500 configured for operation in compliance, for example, with the 802.11a standard. In one example, it may be assumed that the MIMO system 500 is disposed to process a spatially-multiplexed signal using the channel bonding techniques in accordance with some embodiments according to some aspects of the present invention. However, in the present example, it may be assumed that both RF and baseband weighting and signal combining are performed in the manner described, for example, in U.S. patent application Ser. Nos. 10/891,443 and 60/488,845, which are incorporated herein by reference in their entirety, to minimize the bit error rate of the receiver 550.

Some embodiments according to some aspects of the present invention may provide the following expression for the output of the DSP block 588, $S'_{i,j}$, which corresponds to the $i^{th}$ spatially-multiplexed signal and the $j^{th}$ logical channel, at tone k:

$$S'_{ij}(k) = \underline{w}_{ij}^H(k) \underline{D}_j(k) = \underline{w}_{ij}^H(k) U^H H_j(k) \cdot V \cdot \underline{s}_j(k) + \underline{w}_{ij}^H(k) U^H \underline{n}_j(k) \quad (6.)$$

The corresponding output signal-to-interference-noise ratio (SINR) may be expressed as:

$$SINR_{i,j,k} = \frac{\sigma_s^2 \underline{w}_{k,i}^H U^H H_j(k) \cdot \underline{v}_i \underline{v}_i^H H_j^H(k) U \underline{w}_{k,i}}{\sigma_s^2 \sum_{m \neq i} \underline{w}_{k,i}^H U^H H_j(k) \cdot \underline{v}_m \underline{v}_m^H H_k^H U \underline{w}_{k,i} + \sigma^2 \underline{w}_{k,i}^H U^H U \underline{w}_{k,i}} \quad (7.)$$

Since the BER of the receiver 550 can be a complicated function of the channel separating the transmitter 510 from the receiver 550, as well as of the coding/modulation and antenna combining technique used, an approximation of the BER described below is utilized in some embodiments according to some aspects of the present invention. As was discussed, for example, in U.S. patent application Ser. Nos. 10/891,443 and 60/488,845, which are incorporated herein by reference in their entirety, the average BER across the applicable frequency bandwidth may be approximated by a fitting function which takes as argument the post-processing SINR. For example, for mode 1 of 802.11a (BPSK, R1/2), the average bit error rate $\overline{BER}_{i,j}$ corresponding to the $i^{th}$ spatially-multiplexed signal on logical channel j can be modeled by $$\overline{BER_{i,j}} \approx -\sum_{k=1}^{N_t} \tanh(SINR_{i,j,k}) \qquad (8.)$$

where $SINR_{i,j,k}$ is given by Equation (7).

In some embodiments according to some aspects of the present invention, a numerical search (e.g., simulated annealing) is employed to search over all possible values of U and V to minimize the average output BER. For each combination of U and V, the value of $W_j^H(k)$ is calculated by using, for example, the MMSE solution, $$W_j(k) = \left( H_j''(k) H_j''^H(k) + \frac{\sigma^2}{\sigma_s^2} U^H U \right)^{-1} H_j''(k) \qquad (9.)$$

Then, for each triplet of values for U,V, $W_j^H(k)$, the SINR can be computed for each tone, each spatially-multiplexed signal, and for each logical channel according to Equation (7). Finally, a set of (N*K) estimated BER values is obtained from Equation (8). One estimate can be computed for each logical channel of each spatially-multiplexed signal.

Several approaches may then be used to minimize the set of output BERs of the receiver 550 over the set of spatially-multiplexed signals and constituent logical channels. For example, the mean over the set of BERs may be minimized, the maximum over such set may be minimized, or the minimum over such set may be minimized. These approaches are mathematically represented as follows:

$$\min_{U,V} \left\{ \underset{i=1,\ldots,N}{mean} \left\{ \underset{j=1,\ldots,K}{mean} \{\overline{BER_{i,j}}\} \right\} \right\}$$

$$\min_{U,V} \left\{ \underset{i=1,\ldots,N}{\max} \left\{ \underset{j=1,\ldots,K}{\max} \{\overline{BER_{i,j}}\} \right\} \right\}$$

$$\min_{U,V} \left\{ \underset{i=1,\ldots,N}{\min} \left\{ \underset{j=1,\ldots,K}{\min} \{\overline{BER_{i,j}}\} \right\} \right\}$$

Although each of these approaches may be employed in some embodiments according to some aspects of the present invention, the last approach identified above (e.g., minimization of the minimum of the set of BERs) has led to the most favourable performance results in some cases.

Figure 6A:
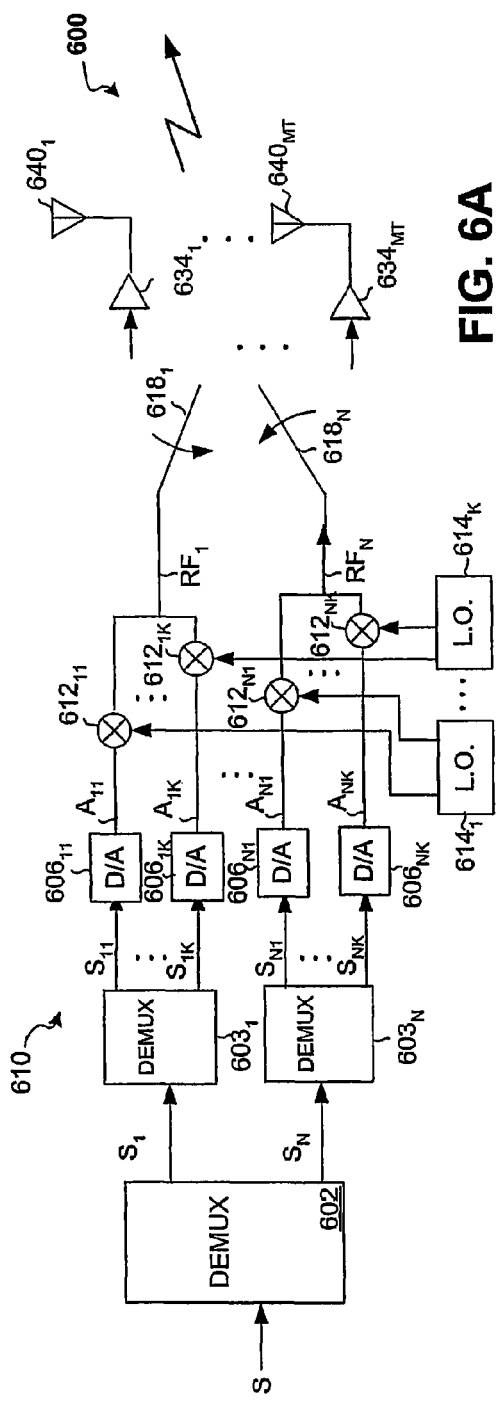
FIGS. 6A-B show block diagrams illustrating an embodiment of a MIMO system according to some aspects of the present invention
Figure 6B:
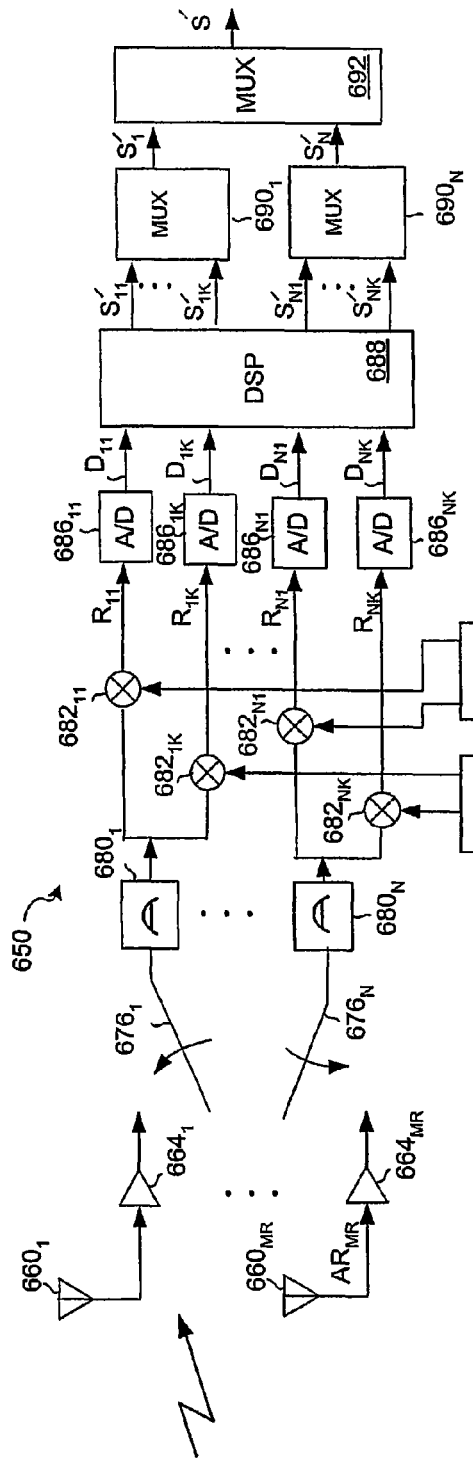

Channel Bonding with Antenna Selection and Baseband Signal Weighting and Combining FIGS. 6A-B show block diagrams illustrating an embodiment of a MIMO system 600 that effects N-fold spatial multiplexing, baseband weighting and combining, and antenna selection within the RF domain according to some aspects of the present invention. The system 600 of FIGS. 6A-B is similar to that of the system 300 of FIGS. 3A-B, but additionally employs, for example, channel bonding to achieve improved data rates in accordance with some embodiments according to some aspects of the present invention. The antenna selection within the RF domain within the system 600 enables, for example, N-fold spatial multiplexing to be implemented using only N transmit/receive RF chains even though more than N transmit/receive antennas are respectively deployed at the transmitter 610 and receiver 650. As illustrated in FIGS. 6A-B, some embodiments according to some aspects of the present invention may provide that the system 600 is similar to the architecture of the system 400A of FIGS. 4A-B in terms of the number of A/Ds and D/As utilized to effect analog/digital and digital/analog conversion, respectively. Some embodiments according to some aspects of the present invention may implement the system 600 of FIGS. 6A-B using an architecture closely resembling that of the system 400B depicted in FIGS. 4C-D. One skilled in the art would be readily able to effect such an implementation in view of the discussion below and the description of the system 400B previously provided with reference to FIGS. 4C-D.

Referring to FIG. 6A, an input signal S to be transmitted (e.g., a stream of digital symbols) is demultiplexed by demultiplexer 602 into N independent substreams $S_{1, 2 \ldots, N}$. Each of the substreams $S_{1, 2 \ldots, N}$ is then demultiplexed by one of a set of N demultiplexers 603 into K independent substreams. The (N*K) substreams $S_{11, 21} \ldots, _{N1}, \ldots _{1K}, \ldots, _{NK}$ are then converted to (N*K) analog signals $A_{11, 12} \ldots, _{1K}, \ldots, _{N1}, \ldots _{NK}$ using a set of (N*K) digital-to-analog (D/A) converters 606.

In some embodiments according to some aspects of the present invention, each of the N analog signals $A_{1i, 2i} \ldots, _{Ni}$ is then upconverted, within a mixer 612, to the applicable transmit carrier RF frequency corresponding to the $i^{th}$ logical channel by mixing the analog signal with a signal provided by a local oscillator $614_i$. This operation can be done independently for each logical channel $i=1, \ldots, K$ by adjusting each of the local oscillators $614_1, \ldots, _K$ to different transmit carrier RF frequencies such that signals transmitted on different logical channels do not overlap in the frequency domain. The set of K upconverted signals originating from the same spatially-multiplexed signal are then combined to form one RF signal $RF_j$, $j=1, \ldots, N$. Each of these N RF signals comprises K components, which each have been upconverted to different carrier frequencies.

Referring to FIG. 6A, the N RF signals (e.g., $RF_{1, 2} \ldots, _N$) are then each connected to a selected subset of N transmit antenna elements by a switch 618. In particular, the switch 618 connects the signals $RF_{1, 2} \ldots, _N$ to a set of N transmit antennas from the MT available transmit antennas 640, thereby yielding a set of N output signals. A corresponding set of N amplifiers 634 then amplify these N output signals, with the amplified output signals then being transmitted using the N selected transmit antennas 640. In some embodiments according to some aspects of the present invention, the amplifiers 634 operate, for example, to amplify signals occupying multiple frequency bands of equal bandwidth centered at different frequency carriers. In some embodiments according to some aspects of the present invention, the amplifiers 634 may be located prior to the switch 618 in the signal processing chain. In this configuration, N amplifiers may be implemented rather than a total of MT amplifiers if one amplifier is utilized at each transmit antenna element 640. The selection of the N antennas is effected, for example, to minimize the BER of the output signal at the receiver in a manner described, for example, within the above-referenced application Ser. Nos. 60/507,843 and 10/957,398, which are incorporated herein by reference in their entirety. Additional details relating to exemplary antenna selection strategies in the presence of channel bonding in accordance with some embodiments according to some aspects of the present invention are provided following the description of the receiver 650 given below.

Referring to FIG. 6B, the N RF signals transmitted by the transmitter 610 are received by the set of MR receive antennas 660 deployed at the receiver 650. Each of the MR received signals is amplified by a respective low noise amplifier 664. Next, N of the amplified signals generated by the amplifier 664 are connected to a set of N RF chains by a switch 676. The resulting N RF signals are then passed through a corresponding set of N filters 680. In some embodiments according to some aspects of the present invention, each low noise amplifier 664 may be located following one of the switches 676, which results in utilization of only N amplifiers 664 rather than the MR amplifiers employed if one amplifier is utilized at each receive antenna element 660. Each filter 680 should span all the frequency bandwidths occupied by the transmitted signal including, for example, bonded subchannels. The resultant filtered signals are then each split into K components, each of which corresponds to a different logical channel $1, \ldots, K$. The one of each set of K component corresponding to the $i^{th}$ logical channel is downconverted from RF to baseband using a mixer 682. As shown, each mixer 682 is provided with a signal from local oscillator 684, adjusted to the RF carrier frequency corresponding to the $i^{th}$ logical channel. This produces a set of (N*K) baseband signals, $R_{11, 12}, \ldots, {}_{1K}, \ldots, {}_{N1}, \ldots {}_{NK}$, which are converted to digital signals using a corresponding set of (N*K) analog-to-digital (A/D) converters 686.

In some embodiments according to some aspects of the present invention, the (N*K) digital signals $D_{11, 12}, \ldots, {}_{1K}, \ldots, {}_{N1}, \ldots {}_{NK}$ are weighted and combined using a digital signal processor 688, thereby forming (N*K) output signals $S'_{11, 21}, \ldots, {}_{N1}, \ldots {}_{1K}, \ldots, {}_{NK}$. The N output signals $S'_{1i, 2i} \ldots, {}_{Ni}$ corresponding to the $i^{th}$ logical channel are typically generated from the N digital signals $D_{1i, 2i} \ldots, {}_{Ni}$ by weighting (e.g., multiplying by a complex number) each of the N digital signals $D_{1i, 2i} \ldots, {}_{Ni}$ by N different weighting coefficients, which forms N*N signals. In some embodiments according to some aspects of the present invention, the N weighting coefficients are dependent (e.g., exclusively dependent) upon the propagation channel path gains corresponding to the $i^{th}$ logical channel. The N*N signals are then combined to form the N output signals $S'_{1i, 2i} \ldots, {}_{Ni}$ for each logical channel $i=1, \ldots, K$, thus producing a total set of (N*K) output signals. In some embodiments according to some aspects of the present invention, the set of N output signals $S'_{1i, 2i} \ldots, {}_{Ni}$ corresponding to the $i^{th}$ logical channel are obtained based only upon the set of N input digital signals $D_{1i, 2i} \ldots, {}_{Ni}$ also corresponding to the $i^{th}$ logical channel. Some embodiments according to some aspects of the present invention provide that no mixing of signals occurs across logical channels and that each logical channel is independently processed in parallel.

In some embodiments according to some aspects of the present invention, the (N*K) output signals produced by the DSP 688 are then grouped into N sets of K signals and fed to N multiplexers 690. A set of N spatially-multiplexed output signals $S'_{1, 2} \ldots, {}_{N}$ comprising estimates of the transmitted signals $S_{1, 2} \ldots, {}_{N}$ is then formed by the multiplexers 690. The N output signals $S'_{1, 2} \ldots, {}_{N}$ are then, in turn, multiplexed by a multiplexer 692 to generate an estimate S' of the original input signal S.

Some embodiments according to some aspects of the present invention provide a method that selects particular subsets of antenna elements to be utilized within the transmitter 610 and/or receiver 650 of the system 600 when channel bonding is employed. Once a subset of antenna elements has been chosen, some embodiments according to some aspects of the present invention provide that the values of the baseband weights used in the DSP 688 be computed in the same way as described, for example, with respect to the system illustrated in FIG. 4 (where T=R=N).

In U.S. patent application Ser. Nos. 10/957,398 and 60/507,843 (the '398 application and the '843 application), which are incorporated herein by reference in their entirety, a method for antenna selection is disclosed for multi-antenna systems without channel bonding. The selection criterion disclosed in the '398 application and the '843 application is premised upon the minimization of the BER of the output signal at the receiver. Some embodiments according to some aspects of the present invention may be consistent with the method disclosed in the '398 application and the '843 application and a common set of antenna elements may be selected across the bandwidth of the user signal frequency even though the channel may exhibit some frequency selectivity.

As discussed above, when channel bonding is introduced, a given user signal is assigned multiple logical channels. However, rather than implementing the antenna selection process of the '398 application and the '843 application with respect to each logical channel, in some embodiments according to some aspects of the present invention, the same subset of antennas for all aggregated logical channels is selected in a manner described below. In some embodiments according to some aspects of the present invention, a subset of antennas for a given multi-antenna transmitter and receiver arrangement is selected to minimize the maximum BER across multiple logical channels of the applicable multi-antenna system. In some embodiments according to some aspects of the present invention, the subset of antenna elements which minimizes the maximum BER across all logical channels is selected from all possible candidate subsets of antenna elements. This selection process may be effected by first estimating the BER of all possible "sub-multi-antenna systems" for all logical channels assigned to the user. In this regard, a "sub-multi-antenna system" is the system resulting from selection of particular subset of antenna elements at a multi-antenna transmitter and receiver. For each sub-multi-antenna system, the maximum BER across all logical channels is stored. Next, the sub-system associated with the minimum of these stored maximum BERs is selected. The transmitter is then informed as to which subset of transmit antenna elements are to be connected to the multiple RF chains of the transmitter, and the receiver is informed as to which subset of receive antenna elements are to be connected to the multiple receive RF chains of the receiver.

Since BER can be a complicated function of the applicable channel as well as of the coding/modulation and antenna combining techniques used, a simplified expression may be used to approximate the BER in some embodiments according to some aspects of the present invention. Some embodiments according to some aspects of the present invention provide that the BER be approximated for a given channel and antenna combining technique in such a way as to vary only as a function of the coding/modulation method employed.

In accordance with some embodiments according to some aspects of the present invention, an example is described of an antenna selection method for use within an implementation of the spatially-multiplexed MIMO system 600 configured for operation in compliance with the 802.11a standard. In the example, it may be assumed, for example, that the MIMO system 600 is disposed to process a spatially-multiplexed signal using the channel bonding techniques in accordance with some embodiments according to some aspects of the present invention. Selection of antenna elements 640 and 660 within the transmitter 610 and receiver 650 is performed under a criterion which aims, for example, to minimize the output bit error rate of the receiver 650. It may be assumed, for example, that the number of transmit antenna elements 640 is equivalent to the number of receive antenna elements (e.g., MT=MR), and that the number of antenna elements is greater than the number of RF chains in both the transmitter 610 and receiver 650 (e.g., M>N). In the general case of an M×M MIMO system being reduced in size to an N×N MIMO system (where M>N), there exist $$\binom{M}{N} = \frac{M!}{N!(M-N)!}$$

possibilities in selecting N antenna elements from a total of M candidate elements. When selection is applied at both the transmitter 610 and receiver 650, the total number of antenna combinations is equal to $$\left(\frac{M!}{N!(M-N)!}\right)^2.$$

The output of the DSP 688 corresponding to spatially-multiplexed signal i, logical channel j, at tone k, and antenna combination c is:

$$S'_{ij,c}(k) = w_{ij,c}{}^H(k)\underline{D}_{j,c}(k) = w_{ij,c}{}^H(k)H_{j,c}(k)\cdot s_j(k) + w_{ij,c}{}^H(k)\underline{n}_{j,c}(k) \quad (10.)$$

where $w_{ij,c}{}^H(k)$ is a 1×N vector of baseband weights, $\underline{D}_{j,c}(k)$ is N×1 vector of received signals at the input of the DSP 688, $H_{j,c}(k)$ is an N×N sub-channel matrix extracted from the complete M×M channel matrix, $s_j(k)$ is a N×1 vector of transmitted spatially-multiplexed signals, and $\underline{n}_{j,c}(k)$ is a N×1 noise vector. The corresponding output SINR, in which the desired signal is $s_{i,j}(k)$, may be expressed as:

$$SINR_{i,j,c,k} = \frac{\sigma_s^2 w_{ij,c}^H(k)\underline{H}^i_{j,c}(k)\underline{H}^{iH}_{j,c}(k)\underline{w}_{ij,c}(k)}{\sigma_s^2 \sum_{m \neq i} w_{ij,c}^H(k)\underline{H}^m_{j,c}(k)\underline{H}^{mH}_{j,c}(k)\underline{w}_{ij,c}(k) + \sigma^2 w_{ij,c}^H(k)\underline{w}_{ij,c}(k)} \quad (11.)$$

As mentioned above, in the present example, the BER is approximated for a given channel and antenna combining technique in such a way as to vary only as a function of the coding/modulation method employed. As is described in U.S. patent application Ser. Nos. 10/891,443 and 60/488,845, which are incorporated herein by reference in their entirety, the average BER (e.g., across all frequency tones k) may be approximated by a fitting function which takes as an argument the post-processing SINR. For example, for a particular operation of the system 600 in compliance with, for example, mode 1 of the 802.11a standard (e.g., BPSK, R1/2), it has been found that the average bit error rate $\overline{BER}_{i,j,c}$ corresponding to the $i^{th}$ spatially-multiplexed signal on logical channel j and antenna combination c may be modeled by:

$$\overline{BER_{i,j,c}} \approx -\sum_{k=1}^{N_t} \tanh(SINR_{i,j,c,k}) \quad (12.)$$

where $SINR_{i,j,c,k}$ is given by Equation (11).

The BER in Equation (12) is computed for all possible antenna combinations and with respect to each logical channel of each spatially-multiplexed signal. Once all cases are computed, a set of N estimates of BER values (e.g., one for each spatially-multiplexed signal) for all $$\frac{M!}{n!(M-n)!}$$

possible antenna combinations and for all logical channels K is obtained. The subset of antennas that minimizes the maximum of the set of BERs is then identified:

$$\min_{\substack{antennas \\ combinations}} \left\{ \max_{j=1,\ldots,K} \left\{ \max_{i=1,\ldots,N} \{\overline{BER}_{i,j,c}\} \right\} \right\}$$

In some embodiments according to some aspects of the present invention, a different selection criteria can be used (e.g., minimization of the mean or minimum over the set of BERs):

$$\min_{\substack{antennas \\ combinations}} \left\{ \underset{j=1,\ldots,K}{mean} \left\{ \underset{i=1,\ldots,N}{mean} \{\overline{BER}_{i,j,c}\} \right\} \right\}$$

$$\min_{\substack{antennas \\ combinations}} \left\{ \min_{j=1,\ldots,K} \left\{ \min_{i=1,\ldots,N} \{\overline{BER}_{i,j,c}\} \right\} \right\}$$

Although each of these approaches could conceivably be employed in various embodiments, it has been found that, in some cases, the first approach described above has led to the most favourable results.

The following United States Patent Applications are hereby incorporated herein by reference in their entirety: U.S. patent application Ser. No. 10/801,930 filed on Mar. 16, 2004; U.S. Patent Application Ser. No. 60/456,023 filed on Mar. 17, 2003; U.S. patent application Ser. No. 10/835,255 filed on Apr. 29, 2004; U.S. Patent Application Ser. No. 60/467,295 filed on May 1, 2003; U.S. patent application Ser. No. 10/891,443 filed on Jul. 13, 2004; U.S. Patent Application Ser. No. 60/488,845 filed on Jul. 21, 2003; U.S. patent application Ser. No. 10/957,398 filed on Oct. 1, 2004; U.S. Patent Application Ser. No. 60/507,843 filed on Oct. 1, 2003; U.S. patent application Ser. No. 10/979,992 filed on Nov. 3, 2004; U.S. Patent Application Ser. No. 60/519,398 filed on Nov. 12, 2003; and U.S. Patent Application Ser. No. 60/529,178 filed on Dec. 11, 2003.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for receiving a transmitted radio frequency (RF) signal based on an input signal, the transmitted RF signal being transmitted by a multi-antenna transmitter and being received by a multi-antenna receiver, the method comprising:
   splitting each of a plurality of received RF signals into a plurality of RF signal components;
   weighting each of the plurality of RF signal components with receive RF weight values;

combining ones of the resultant RF weighted signal components to form a plurality of RF weighted signals;

converting the plurality of RF weighted signals into receive baseband signals;

weighting each of the receive baseband signals with receive baseband weight values; and multiplexing the receive baseband weighted signals to obtain an estimate of the input signal.

2. The method according to claim 1, wherein each of the plurality of RF signal components is assigned a logical channel of a plurality of logical channels.

3. The method according to claim 2, wherein each of the plurality of logical channels is of a uniform type selected from at least one of a frequency bandwidth, a time slot and a code number.

4. The method according to claim 1, wherein a first subset of the receive baseband weight values are multiplied with ones of signal components of the receive baseband signals assigned to a first of a plurality of logical channels, each value within the first subset of the receive baseband weight values being a function of propagation channel path gains corresponding to the first of the plurality of logical channels.

5. The method according to claim 1, wherein the set of receive RF weight values is computed to maximize, at the receiver, a signal-to-noise ratio characterizing an aggregated channel comprising a plurality of logical channels.

6. The method according to claim 1, wherein the set of receive RF weight values is computed to maximize, at the receiver, a capacity or a throughput characterizing an aggregated channel comprising a plurality of logical channels.

7. The method according to claim 1, wherein the set of receive RF weight values is computed to minimize, at the receiver, a bit error rate characterizing an aggregated channel comprising a plurality of logical channels.

8. The method according to claim 1, wherein the set of receive RF weight values is computed to minimize, at the receiver, a maximum bit error rate characterizing an aggregated channel comprising a plurality of logical channels.

9. The method according to claim 1, comprising:

selecting a subset of antennas from the plurality of antennas of the receiver for connection to the plurality of receive RF signals, the subset of antennas being selected based upon a predefined selection criterion.

10. The method according to claim 9, wherein the predefined selection criterion comprises at least one of (i) maximizing, at the receiver, a capacity or a signal-to-noise ratio characterizing an aggregated channel comprising a plurality of logical channels, and (ii) minimizing, at the receiver, a bit error rate characterizing an aggregated channel comprising the plurality of logical channels.

11. The method according to claim 9, wherein the predefined selection criterion comprises minimizing, at the receiver, a maximum of a bit error rate characterizing an aggregated channel comprising a plurality of logical channels.

12. The method according to claim 1, comprising:

filtering the plurality of receive RF signals with a filter having a frequency bandwidth encompassing a set of bandwidths associated with a plurality of logical channels.

13. The method according to claim 12, wherein the converting comprises mixing each of the plurality of RF weighted signals in the RF domain with a signal having a frequency corresponding to a center frequency of one of the plurality of logical channels.

14. The method according to claim 1, wherein the converting comprises mixing each of the plurality of RF weighted signals in the RF domain with a signal having a frequency corresponding to a center frequency of one of a plurality of logical channels.

15. The method according to claim 1, wherein the transmitted RF signal comprises at least one of: a code division multiple access signal, a single carrier signal, an orthogonal frequency division multiplexed signal and an ultra-wideband signal.

16. A signal reception method for use within a receiver, the receiver being coupled to a plurality of antennas adapted to produce a corresponding plurality of receive radio frequency (RF) signals in response to an incidence of a transmitted RF signal, the transmitted RF signal being transmitted wirelessly by a multi-antenna transmitting device and originating from an input signal comprising a set of spatially-multiplexed signals, the method comprising:

splitting each of the plurality of receive RF signals into a plurality of RF signal components;

weighting each of the plurality of RF signal components with receive RF weight values;

downconverting the plurality of RF weighted signal components into receive baseband signal components;

combining and baseband weighting ones of the resultant receive baseband signal components to form a plurality of receive baseband weighted signals, each of the plurality of receive baseband weighted signals being assigned to one of a plurality of logical channels and being associated with one of the spatially-multiplexed signals;

multiplexing a group of the plurality of receive baseband weighted signals corresponding to each of the spatially-multiplexed signals to form a plurality of multiplexed received signals; and multiplexing the plurality of multiplexed received signals to obtain an estimate of the input signal.

17. The method according to claim 16, wherein each of the plurality of logical channels is of a uniform type selected from at least one of a frequency bandwidth, a time slot and a code number.

18. The method according to claim 16, wherein a first subset of the receive RF weight values is multiplied with ones of signal components assigned to a first of the plurality of logical channels, each value within the first subset of the receive RF weight values being a function only of propagation channel path gains corresponding to the first of the plurality of logical channels.

19. The method according to claim 16, wherein a logical channel of the plurality of logical channels is assigned to each of the plurality of RF signal components.

20. The method according to claim 16, wherein the set of receive RF weight values is computed to maximize, at the receiver, a signal-to-noise ratio characterizing an aggregated channel comprising the plurality of logical channels.

21. The method according to claim 16, wherein the set of receive RF weight values is computed to maximize, at the receiver, a capacity or a throughput characterizing an aggregated channel comprising the plurality of logical channels.

22. The method according to claim 16, wherein the set of receive RF weight values is computed to minimize, at the receiver, a bit error rate characterizing an aggregated channel comprising the plurality of logical channels.

23. The method according to claim 16, wherein the set of receive RF weight values is computed to minimize, at the receiver, a maximum of a bit error rate characterizing an aggregated channel comprising the plurality of logical channels.

24. The method according to claim 16, comprising:
selecting a subset of antennas from the plurality of antennas for connection to the plurality of received RF signals, the subset of antennas being selected based upon a predefined selection criterion.

25. The method according to claim 24, wherein the predefined selection criterion comprises at least one of (i) maximizing, at the receiver, a capacity or a signal-to-noise ratio characterizing an aggregated channel comprising the plurality of logical channels, and (ii) minimizing, at the receiver, a bit error rate characterizing an aggregated channel comprising the plurality of logical channels.

26. The method according to claim 24, wherein the predefined selection criterion comprises minimizing, at the receiver, a maximum of a bit error rate characterizing an aggregated channel comprising the plurality of logical channels.

27. The method according to claim 16, comprising:
filtering the plurality of received RF signals utilizing a filter having a frequency bandwidth encompassing a set of bandwidths associated with the plurality of logical channels.

28. The method according to claim 27, wherein the downconverting comprises mixing each of the weighted signal components in the RF domain with a signal having a frequency corresponding to a center frequency of one of the plurality of logical channels.

29. The method according to claim 16, wherein the downconverting comprises mixing each of weighted the signal components in the RF domain with a signal having a frequency corresponding to a center frequency of one of the plurality of logical channels.

30. The method according to claim 16, wherein the transmitted RF signal comprises at least one of a code division multiple access signal, a single carrier signal, an orthogonal frequency division multiplexed signal and an ultra-wideband signal.

31. A receiver that is coupled to a plurality of receive antennas adapted to produce a corresponding plurality of receive radio frequency (RF) signals in response to an incidence of a transmitted RF signal originating from an input signal, the input signal being demultiplexed into N substreams in which N is an integer, the transmitted RF signal being transmitted wirelessly from a multi-antenna transmitter to the plurality of receive antennas, the receiver comprising:
an RF processing arrangement adapted to split each of the plurality of received RF signals into a plurality of RF signal components, to weight each of the plurality of RF signal components with receive RF weight values, the plurality of RF weighted signal components being combined into N RF signals, the RF processing arrangement being adapted to split each of the N RF signals into a plurality of baseband signal components; and
a digital signal processor operatively coupled to the RF processing arrangement, the digital signal processor adapted to weight each of the plurality of baseband signal components with receive baseband weight values and to combine ones of the resultant weighted baseband signal components to form a plurality of receive weighted baseband signals.

32. The receiver according to claim 31,
wherein each of the plurality of receive baseband weighted signals is assigned to one of a plurality of logical channels, and
wherein each of the plurality of logical channels is of a uniform type selected from at least one of a frequency bandwidth, a time slot and a code number.

33. The receiver according to claim 31, wherein the digital signal processor is adapted to multiply a first subset of the receive baseband weight values with ones of signal components assigned to a first of a plurality of logical channels, each value within the first subset of the receive baseband weight values being a function of propagation channel path gains corresponding to the first of the plurality of logical channels.

34. The receiver according to claim 31,
wherein each of the plurality of receive baseband weighted signals is assigned to one of a plurality of logical channels, and
wherein each logical channel of the plurality of logical channels comprises a different frequency channel.

35. The receiver according to claim 31, wherein each of the plurality of receive baseband weighted signals being assigned to one of a plurality of logical channels.

36. The receiver according to claim 31, comprising:
a multiplexer arrangement operatively coupled to the digital signal processor, the multiplexer arrangement being adapted to multiplex the plurality of receive baseband weighted signals to obtain an estimate of the input signal.

37. A wireless receiver coupled to a plurality of antennas adapted to produce a corresponding plurality of received radio frequency (RF) signals in response to an incidence of a transmitted RF signal, the transmitted RF signal originating from an input signal comprising a set of spatially-multiplexed signals, the transmitted RF signal being transmitted wirelessly from a multi-antenna transmitting device to the receiver, the receiver comprising:
an RF processing arrangement adapted to split each of the plurality of received RF signals into a plurality of RF signal components, to weight each of the plurality of RF signal components with an RF weight, and to combine the RF weighted signal components into a second plurality of RF signals, the RF processing arrangement being adapted to split each of the second plurality of RF signals into a plurality of baseband signal components;
a digital signal processor coupled to the RF processing arrangement, the digital signal processor adapted to weight each of the plurality of baseband signal components with receive baseband weight values and to combine ones of the resultant baseband weighted signal components to form a plurality of receive baseband weighted signals, each of the plurality of receive baseband weighted signals being assigned to one of the plurality of logical channels and being associated with one of the spatially-multiplexed signals; and
a multiplexing arrangement coupled to the digital signal processor.

38. The receiver according to claim 37, wherein the multiplexing arrangement is adapted to multiplex a group of the plurality of receive baseband weighted signals corresponding to each of the spatially-multiplexed signals to form a plurality of multiplexed received signals.

39. The receiver according to claim 38, wherein the multiplexing arrangement is adapted to multiplex the plurality of multiplexed received signals to obtain an estimate of the input signal.

* * * * *

UNITED STATES PATENT AND TRADEMARK OFFICE
CERTIFICATE OF CORRECTION

PATENT NO. : 8,185,075 B2
APPLICATION NO. : 12/119231
DATED : May 22, 2012
INVENTOR(S) : Catreux-Erceg et al.

It is certified that error appears in the above-identified patent and that said Letters Patent is hereby corrected as shown below:

Title Page
Item (63), please replace the related application data text with --Continuation of application No. 11/009,503, filed on Dec. 10, 2004, now Pat. No. 7,391,832, which is a continuation-in-part of application No. 10/801,930, filed on Mar. 16, 2004, now Pat. No. 7,822,140, which claims benefit of application No. 60/456,023, filed March 17, 2003, and continuation-in-part of application No. 10/835,255, filed on Apr. 29, 2004, now Pat. No. 7,539,274, which claims benefit of application No. 60/467,295, filed May 1, 2003, and a continuation-in-part of application No. 10/891,443, filed on Jul. 13, 2004, now Pat. No. 7,502,432, which claims benefit of application No. 60/488,845, filed July 21, 2003, and a continuation-in-part of application No. 10/957,398, filed on Oct. 1, 2004, now Pat. No. 7,483,718, which claims benefit of application No. 60/507,843, filed October 1, 2003, and a continuation-in-part of application No. 10/979,992, filed on Nov. 3, 2004, now Pat. No. 7,515,939, which claims benefit of application No. 60/519,398, filed November 12, 2003.--.

Column 33
Line 29, Claim 29, please replace "weighted the" with --the weighted--.

Signed and Sealed this
Twenty-third Day of October, 2012

David J. Kappos
*Director of the United States Patent and Trademark Office*